United States Patent
Saikou

(10) Patent No.: US 11,023,713 B2
(45) Date of Patent: *Jun. 1, 2021

(54) SUSPICIOUSNESS DEGREE ESTIMATION MODEL GENERATION DEVICE

(71) Applicant: NEC CORPORATION, Tokyo (JP)

(72) Inventor: Masahiro Saikou, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/599,731

(22) Filed: Oct. 11, 2019

(65) Prior Publication Data

US 2020/0042774 A1 Feb. 6, 2020

Related U.S. Application Data

(63) Continuation of application No. 16/475,718, filed as application No. PCT/JP2017/041538 on Nov. 17, 2017.

(30) Foreign Application Priority Data

Jan. 5, 2017 (JP) .............................. JP2017-000543

(51) Int. Cl.
*G06K 9/00* (2006.01)

(52) U.S. Cl.
CPC ..... *G06K 9/00288* (2013.01); *G06K 9/00268* (2013.01)

(58) Field of Classification Search
CPC .. G06K 9/00288; G06K 9/00268; H04N 7/18; G06T 7/00
See application file for complete search history.

(56) References Cited

U.S. PATENT DOCUMENTS

| 9,135,499 B2* | 9/2015 | Bergman | G08B 13/248 |
| 9,852,606 B1* | 12/2017 | Heier | G06F 16/248 |

(Continued)

FOREIGN PATENT DOCUMENTS

| JP | 2004-158013 A | 6/2004 |
| JP | 2007-140695 A | 6/2007 |

(Continued)

OTHER PUBLICATIONS

International Search Report of PCT/JP2017/041538 dated Dec. 26, 2017 [PCT/ISA/210].

*Primary Examiner* — Aaron W Carter
(74) *Attorney, Agent, or Firm* — Sughrue Mion, PLLC

(57) ABSTRACT

A suspiciousness degree estimation model generation device includes: a clustering unit that performs clustering on an input face image based on the feature extracted from the face image; and a suspiciousness degree estimation model generation unit that generates a suspiciousness degree estimation model used for estimating the suspiciousness degree of an estimation target person, based on the result of clustering by the clustering unit and suspiciousness degree information that is previously associated with a face image included by the clustering result and that shows the suspiciousness degree of a person shown by the face image. The suspiciousness degree estimation device includes: a feature extraction unit that extracts a feature from a face area of an estimation target person; and a suspiciousness degree estimation unit estimates the suspiciousness degree of the estimation target person, based on the feature extracted by the feature extraction unit and the suspiciousness degree estimation model generated by the suspiciousness degree estimation model generation device.

16 Claims, 7 Drawing Sheets

(56) References Cited

U.S. PATENT DOCUMENTS

| | | | |
|---|---|---|---|
| 10,846,966 B2* | 11/2020 | Saso | G08B 13/19645 |
| 2002/0176610 A1* | 11/2002 | Okazaki | G06K 9/00221 |
| | | | 382/118 |
| 2004/0151351 A1* | 8/2004 | Ito | G06K 9/6217 |
| | | | 382/118 |
| 2007/0014439 A1* | 1/2007 | Ando | G08B 31/00 |
| | | | 382/118 |
| 2007/0189585 A1* | 8/2007 | Sukegawa | G06K 9/00885 |
| | | | 382/118 |
| 2008/0080748 A1* | 4/2008 | Sukegawa | G06K 9/00885 |
| | | | 382/118 |
| 2011/0063441 A1* | 3/2011 | Asa | H04N 7/18 |
| | | | 348/143 |
| 2013/0164722 A1* | 6/2013 | Yoshimitsu | G06K 9/00771 |
| | | | 434/236 |
| 2013/0195359 A1* | 8/2013 | Yabu | G06K 9/34 |
| | | | 382/171 |
| 2013/0243274 A1* | 9/2013 | Sukegawa | G06K 9/00221 |
| | | | 382/118 |
| 2013/0243278 A1* | 9/2013 | Saito | G06K 9/6247 |
| | | | 382/128 |
| 2013/0266196 A1* | 10/2013 | Kono | G06K 9/00771 |
| | | | 382/118 |
| 2013/0272584 A1* | 10/2013 | Kono | G07F 17/3237 |
| | | | 382/118 |
| 2014/0254890 A1* | 9/2014 | Bergman | G08B 13/248 |
| | | | 382/118 |
| 2015/0063640 A1* | 3/2015 | Anabuki | G06T 7/20 |
| | | | 382/103 |
| 2016/0012280 A1* | 1/2016 | Ito | G06K 9/00268 |
| | | | 382/305 |
| 2017/0091560 A1* | 3/2017 | Miwa | G08B 25/10 |
| 2017/0278348 A1* | 9/2017 | Takeda | H04N 7/188 |
| 2017/0294089 A1* | 10/2017 | Miwa | H04W 4/02 |
| 2018/0239953 A1* | 8/2018 | Miwa | G06K 9/00228 |
| 2018/0284217 A1* | 10/2018 | Takeuchi | H04B 7/10 |
| 2019/0163966 A1* | 5/2019 | Moriya | G06K 9/00295 |
| 2019/0347473 A1* | 11/2019 | Saikou | G06K 9/00288 |
| 2020/0042774 A1* | 2/2020 | Saikou | G06T 7/00 |
| 2020/0050838 A1* | 2/2020 | Saikou | H04N 7/18 |
| 2020/0050873 A1* | 2/2020 | Ikeda | G06T 7/20 |
| 2020/0057885 A1* | 2/2020 | Rao | G06K 9/623 |
| 2020/0210714 A1* | 7/2020 | Kato | G06K 9/00335 |
| 2020/0219234 A1* | 7/2020 | Sotodate | G06T 5/50 |

FOREIGN PATENT DOCUMENTS

| | | |
|---|---|---|
| JP | 2009-077064 A | 4/2009 |
| JP | 4521086 B2 | 8/2010 |
| JP | 2010-198199 A | 9/2010 |
| JP | 2012-212969 A | 11/2012 |
| JP | 2013-088870 A | 5/2013 |

* cited by examiner

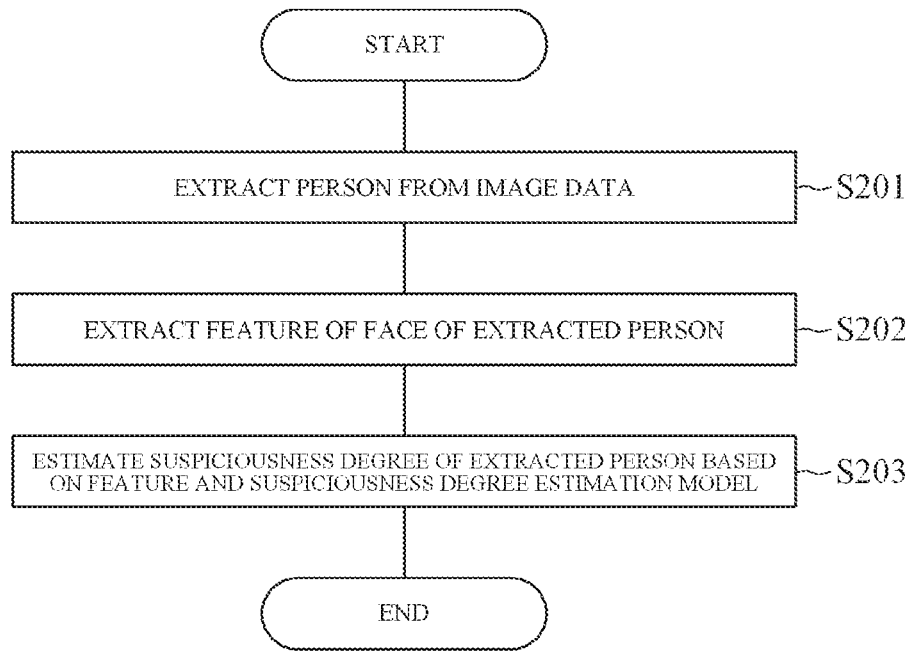
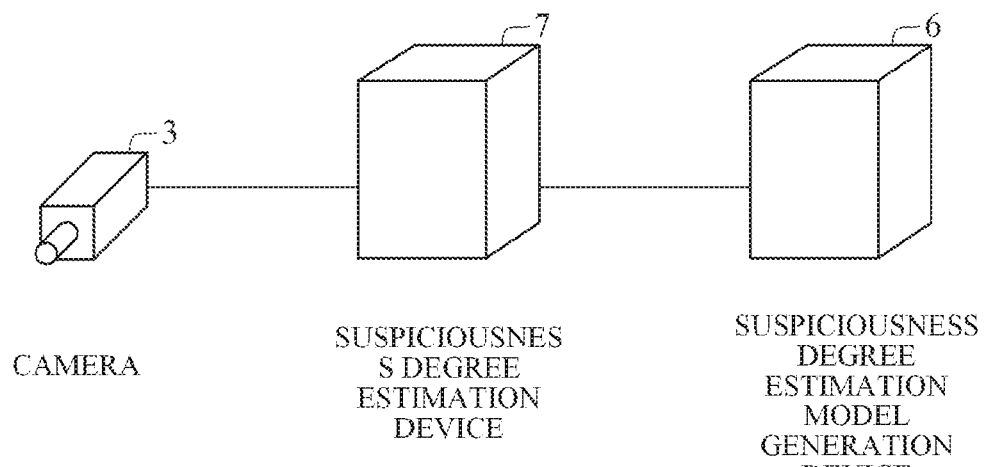

SUSPICIOUSNESS DEGREE ESTIMATION MODEL GENERATION DEVICE

CROSS REFERENCE TO RELATED APPLICATIONS

This application is a Continuation of U.S. application Ser. No. 16/475,718 filed Jul. 3, 2019, which is a National Stage of International Application No. PCT/JP2017/041538 filed Nov. 17, 2017, claiming priority to Japanese Patent Application No. 2017-000543 filed Jan. 5, 2017, the contents of all of which are incorporated herein by reference in their entirety.

TECHNICAL FIELD

The present invention relates to a suspiciousness degree estimation model generation device, a suspiciousness degree estimation model generation method, a suspiciousness degree estimation device, a suspiciousness degree estimation method, a program, a suspiciousness degree estimation system, and a camera. More specifically, the present invention relates to a suspiciousness degree estimation model generation device that extracts a feature from a face image and performs predetermined estimation, a suspiciousness degree estimation model generation method, a suspiciousness degree estimation device, a suspiciousness degree estimation method, a program, a suspiciousness degree estimation system, and a camera.

BACKGROUND ART

A technique of processing a face image and estimating the attribute of a person of the face image is known.

For example, Patent Document 1 describes a face image recognition device that has a face area extraction unit, a feature extraction unit, a registration information holding unit, and a control unit. To be specific, the registration information holding unit holds a reference feature such as an eigenvector that indicates the feature of each age group. The control unit compares a feature extracted by the feature extraction unit with the reference feature and determines an age group regarded to have the highest similarity as the age of the subject. According to Patent Document 1, such a configuration makes it possible to estimate an age that is the attribute of a subject based on a face image and execute control, for example, permit the subject to operate when the subject's age is a predetermined age or more.

Further, for example, Patent Document 2 describes a prior technique in a commercial field, which is different from the present invention in technical field. Patent Document 2 describes an information providing system that has an image acquisition unit, a face image extraction unit, a database in which group information associated with product information is stored, and a feature checking unit that checks the feature of a user against the group information and identifies the product information. According to Patent Document 2, the configuration described above makes it possible to provide a user with highly entertaining product information.

Patent Document 1: Japanese Patent Publication No. JP4521086

Patent Document 2: Japanese Unexamined Patent Application Publication No. JP-A 2010-198199

In the case of the technique described in Patent Document 1, a feature extracted by the feature extraction unit is compared with the reference feature, and an age group regarded to have the highest similarity is determined as the age of the subject. Because such processing is performed, according to the technique described in Patent Document 1, in order to estimate an age that is the attribute of the owner of a face image based on the face image, it is necessary to previously hold a reference feature such as an eigenvector of each age to be compared with the feature of the face image. In other words, in the case of the technique described in Patent Document 1, it is impossible to estimate the attribute of a person of a face image in a case where the definition of each age group that is an attribute to be estimated is not made in advance. Therefore, according to the technique described in Patent Document 1, it is difficult to estimate an attribute for which class definition is difficult.

Thus, it has been difficult to estimate an attribute for which class definition is difficult based on a feature extracted from a face image. Therefore, for example, it is difficult to estimate an attribute for which class definition is difficult, such as the suspiciousness degree of a person, based on a face image, and there has been a problem that it is difficult to detect a suspicious person who is not previously registered as a blacklisted person based on a face image.

SUMMARY

Accordingly, an object of the present invention is to provide a suspiciousness degree estimation model generation device, a suspiciousness degree estimation model generation method, a suspiciousness degree estimation device, a suspiciousness degree estimation method, a program, a suspiciousness degree estimation system and a camera, which solve the problem that it is difficult to detect a suspicious person who is not previously registered as a blacklisted person based on a face image.

In order to achieve the object, a suspiciousness degree estimation model generation device as an aspect of the present invention includes:

a clustering unit configured to perform clustering on an input face image based on a feature extracted from the face image; and a suspiciousness degree estimation model generation unit configured to generate a suspiciousness degree estimation model used for estimating a suspiciousness degree of an estimation target person, based on a result of clustering by the clustering unit and suspiciousness degree information previously associated with a face image included by the result of clustering, the suspiciousness degree information showing a suspiciousness degree of a person shown by the face image.

Further, a suspiciousness degree estimation model generation method as another aspect of the present invention includes:

performing clustering on an input face image based on a feature extracted from the face image; and generating a suspiciousness degree estimation model used for estimating a suspiciousness degree of an estimation target person, based on a result of clustering and suspiciousness degree information previously associated with a face image included by the result of clustering, the suspiciousness degree information showing a suspiciousness degree of a person shown by the face image.

Further, a program as another aspect of the present invention includes instructions for causing an information processing device to realize:

a clustering unit configured to perform clustering on an input face image based on a feature extracted from the face image; and a suspiciousness degree estimation model generation unit configured to generate a suspiciousness degree estimation model used for estimating a suspiciousness degree of an estimation target person, based on a result of clustering by the clustering unit and suspiciousness degree information previously associated with a face image included by the result of clustering, the suspiciousness degree information showing a suspiciousness degree of a person shown by the face image.

Further, a suspiciousness degree estimation device as another aspect of the present invention includes:

a feature extraction unit configured to extract a feature from a face area of an estimation target person; and a suspiciousness degree estimation unit configured to estimate a suspiciousness degree of the estimation target person, based on the feature extracted by the feature extraction unit and a previously generated suspiciousness degree estimation model, wherein the suspiciousness degree estimation model is generated based on a result of clustering on a previously stored face image based on a feature extracted from the face image and suspiciousness degree information previously associated with a face image included in the result of clustering, the suspiciousness degree information showing a suspiciousness degree of a person shown by the face image.

Further, a suspiciousness degree estimation method as another aspect of the present invention includes:

extracting a feature from a face area of an estimation target person; and estimating a suspiciousness degree of the estimation target person, based on the extracted feature and a suspiciousness degree estimation model previously generated based on a result of clustering on a previously stored face image based on a feature extracted from the face image and suspiciousness degree information previously associated with a face image included in the result of clustering, the suspiciousness degree information showing a suspiciousness degree of a person shown by the face image.

Further, a program as another aspect of the present invention includes instructions for causing an information processing device to realize:

a feature extraction unit configured to extract a feature from a face area of an estimation target person; and a suspiciousness degree estimation unit configured to estimate a suspiciousness degree of the estimation target person, based on the feature extracted by the feature extraction unit and a previously generated suspiciousness degree estimation model, wherein the suspiciousness degree estimation model is generated based on a result of clustering on a previously stored face image based on a feature extracted from the face image and suspiciousness degree information previously associated with a face image included in the result of clustering, the suspiciousness degree information showing a suspiciousness degree of a person shown by the face image.

Further, a suspiciousness degree estimation system as another aspect of the present invention includes a suspiciousness degree estimation model generation device and a suspiciousness degree estimation device, the suspiciousness degree estimation model generation device including:

a clustering unit configured to perform clustering on an input face image based on a feature extracted from the face image; and a suspiciousness degree estimation model generation unit configured to generate a suspiciousness degree estimation model used for estimating a suspiciousness degree of an estimation target person, based on a result of clustering by the clustering unit and suspiciousness degree information previously associated with a face image included by the result of clustering, the suspiciousness degree information showing a suspiciousness degree of a person shown by the face image, the suspiciousness degree estimation device including:

a feature extraction unit configured to extract a feature from a face area of an estimation target person; and a suspiciousness degree estimation unit configured to estimate a suspiciousness degree of the estimation target person, based on the feature extracted by the feature extraction unit and the suspiciousness degree estimation model generated by the suspiciousness degree estimation model generation device.

Further, a camera as another aspect of the present invention is a camera having an imaging unit, the camera comprising:

a feature extraction unit configured to extract a feature from a face area of an estimation target person imaged by the imaging unit; and a suspiciousness degree estimation unit configured to estimate a suspiciousness degree of the estimation target person, based on the feature extracted by the feature extraction unit and a previously generated suspiciousness degree estimation model, wherein the suspiciousness degree estimation model is generated based on a result of clustering on a previously stored face image based on a feature extracted from the face image and suspiciousness degree information previously associated with a face image included in the result of clustering, the suspiciousness degree information showing a suspiciousness degree of a person shown by the face image.

With the configurations as described above, the present invention can provide a suspiciousness degree estimation device, a suspiciousness degree estimation model generation device, a suspiciousness degree estimation method, a suspiciousness degree estimation model generation method, a program, a suspiciousness degree estimation system and a camera, which solve the problem that it is difficult to detect a suspicious person who is not previously registered as a blacklisted person based on a face image.

BRIEF DESCRIPTION OF DRAWINGS

FIG. 7 is a flowchart showing an example of processing when the suspiciousness degree estimation device estimates the suspiciousness degree of a person;

FIG. 8 is a diagram showing an example of the overall configuration of a suspiciousness degree estimation system according to a second example embodiment of the present invention;

EXAMPLE EMBODIMENTS

First Example Embodiment

Figure 1:
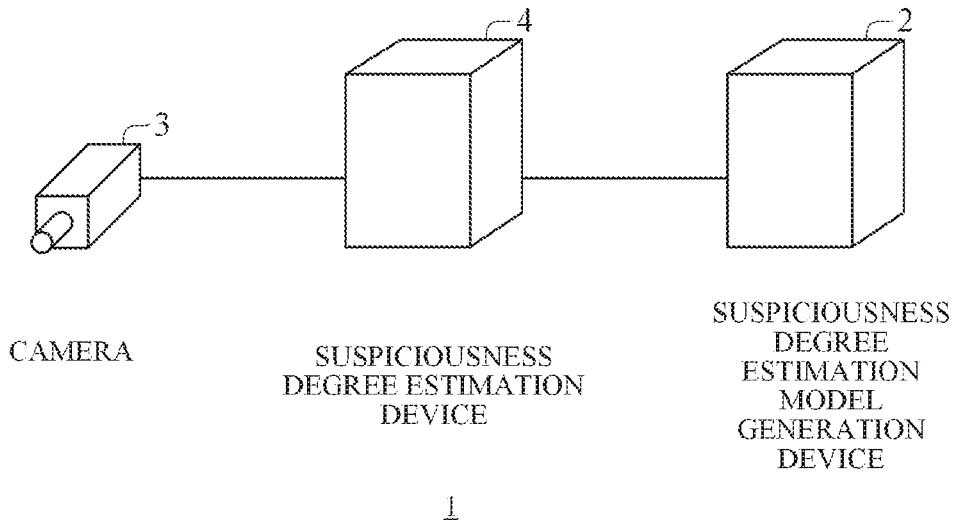
FIG. 1 is a diagram showing an example of the overall configuration of a suspiciousness degree estimation system according to a first example embodiment of the present invention.
Figure 2:
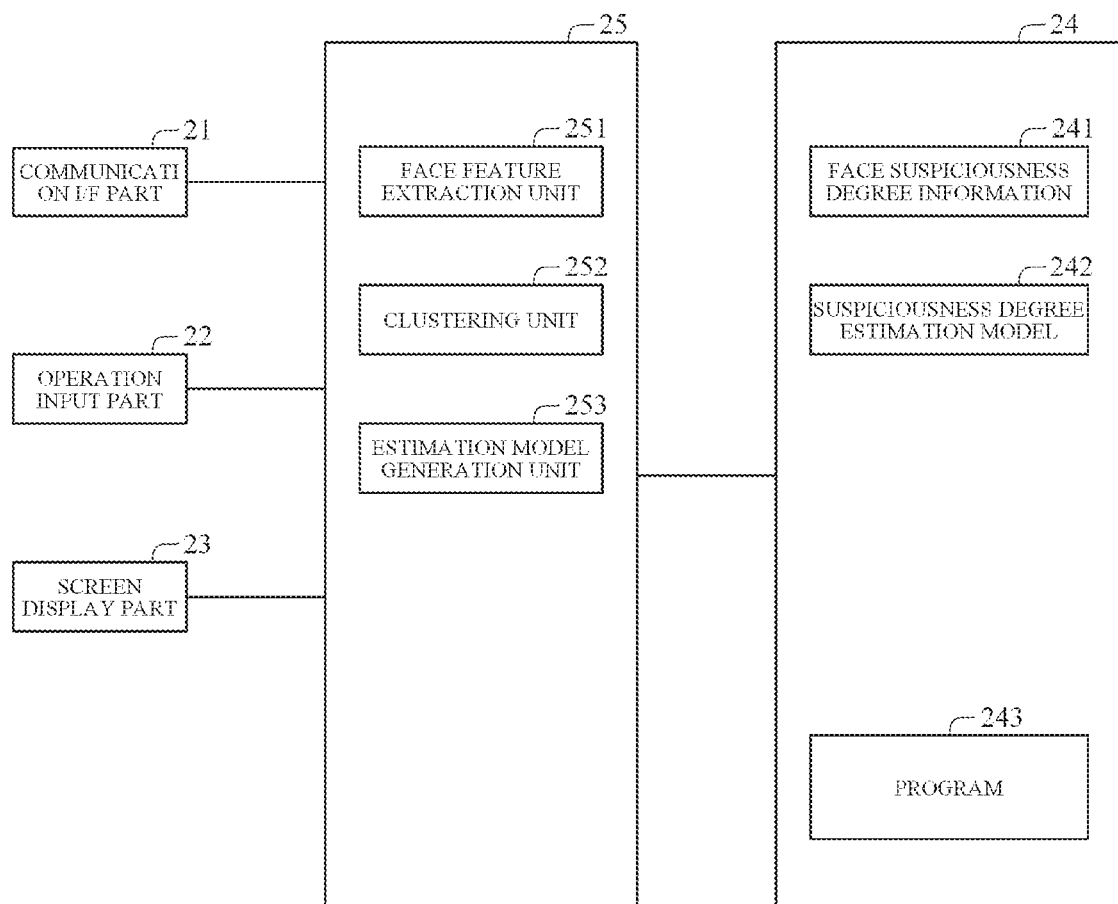
FIG. 2 is a block diagram showing an example of the configuration of a suspiciousness degree estimation model generation device shown in FIG. 1.
Figure 3:
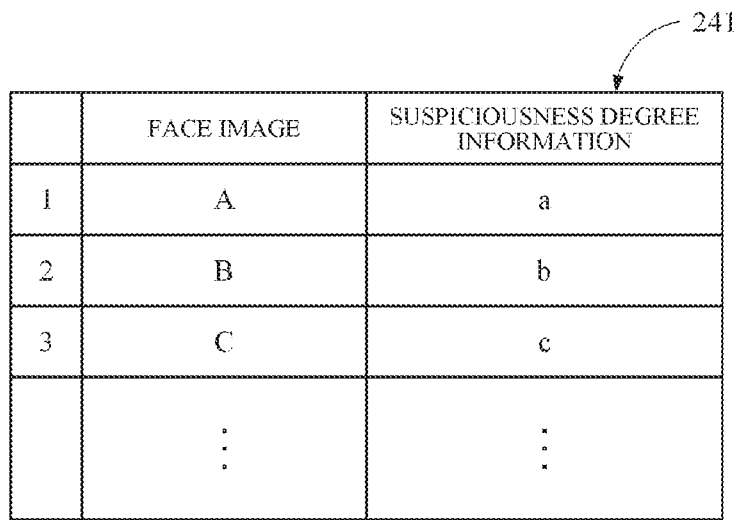
FIG. 3 is a diagram showing an example of face suspiciousness degree information shown in FIG. 2.
Figure 4:
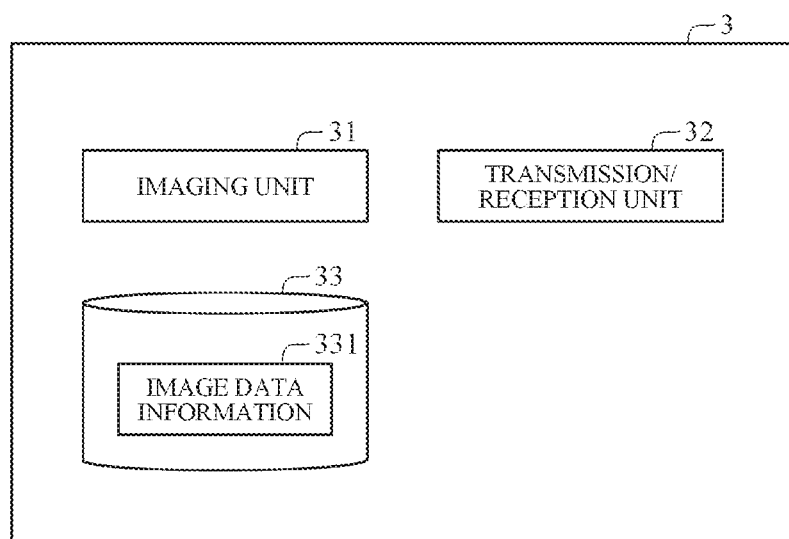
FIG. 4 is a block diagram showing an example of the configuration of a camera shown in FIG. 1.
Figure 5:
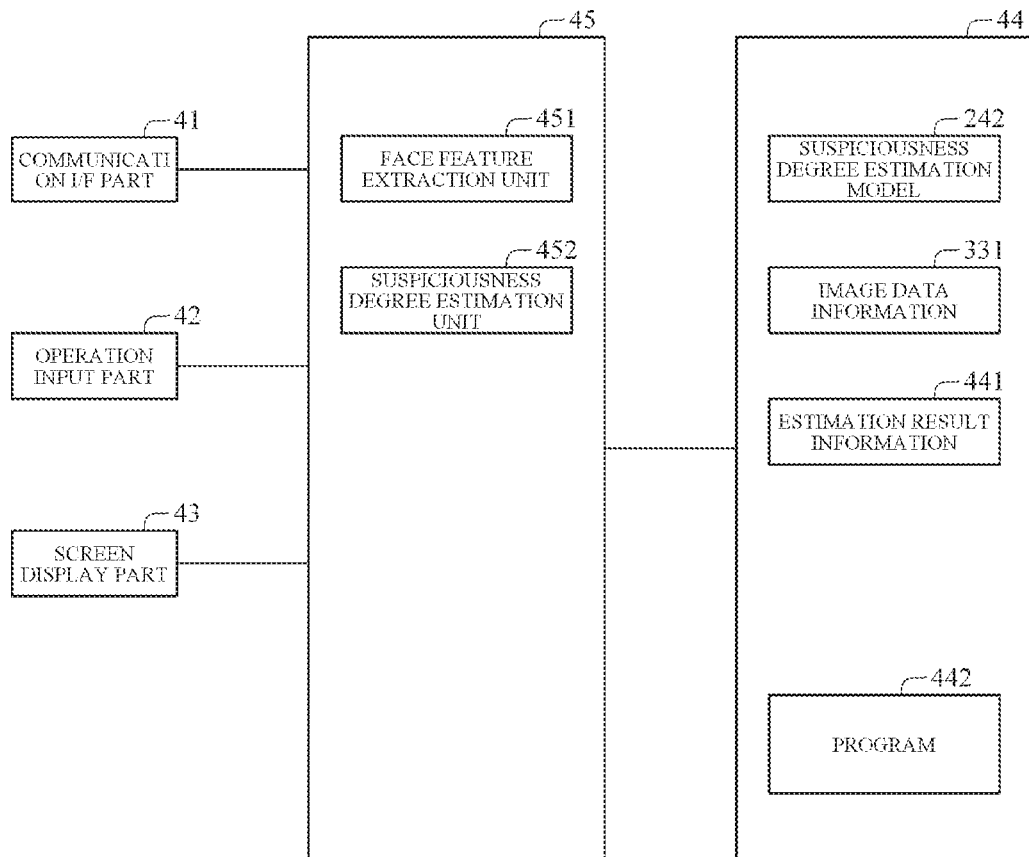
FIG. 5 is a block diagram showing an example of the configuration of a suspiciousness degree estimation device shown in FIG. 1.
Figure 6:
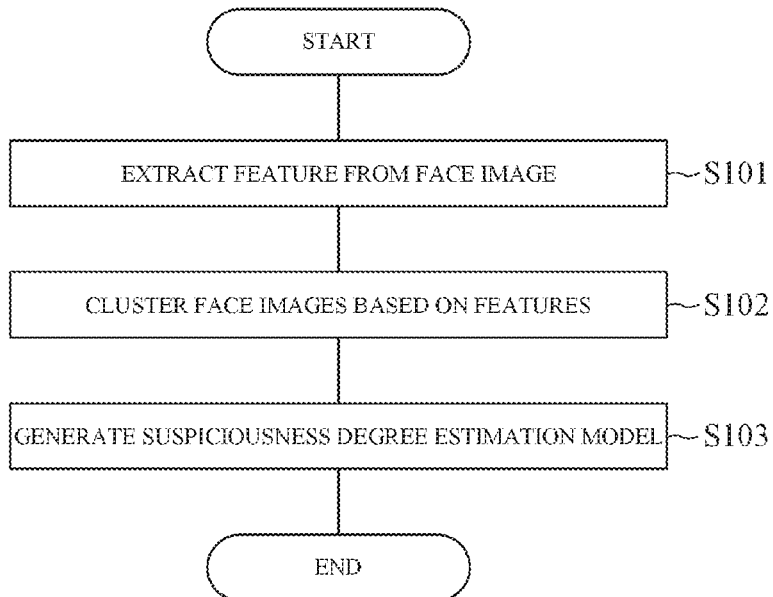
FIG. 6 is a flowchart showing an example of processing when the suspiciousness degree estimation model generation device generates a suspiciousness degree estimation model.

A first example embodiment of the present invention will be described with reference to FIGS. 1 to 7. FIG. 1 is a diagram showing an example of the overall configuration of a suspiciousness degree estimation system 1. FIG. 2 is a block diagram showing an example of the configuration of a suspiciousness degree estimation model generation device 2. FIG. 3 is a diagram showing an example of face suspiciousness degree information 241. FIG. 4 is a block diagram showing an example of the configuration of a camera 3. FIG. 5 is a block diagram showing an example of the configuration of a suspiciousness degree estimation device 4. FIG. 6 is a flowchart showing an example of processing when the suspiciousness degree estimation model generation device 2 generates a suspiciousness degree estimation model 242. FIG. 7 is a flowchart showing an example of processing when the suspiciousness degree estimation device 4 estimates the suspiciousness degree of a person.

In the first example embodiment, the suspiciousness degree estimation system 1 that estimates the suspiciousness degree of a person imaged by the camera 3. As will be described later, the suspiciousness degree estimation system 1 has the suspiciousness degree estimation model 242 having been previously generated. The suspiciousness degree estimation system 1 determines the suspiciousness degree of a person imaged by the camera 3, based on a feature extracted from the face area of a person in image data captured by the camera 3 and the suspiciousness degree estimation model 242. In this example embodiment, the suspiciousness degree estimation model 242 is generated based on, for example, the result of clustering face images having been prepared based on the features of faces extracted from the face images and suspiciousness degree information associated with the face images. Thus, by generating the suspiciousness degree estimation model 242 based on the result of clustering by using only face features without using a suspiciousness degree that is the attribute of a person, it is possible to estimate an attribute for which class definition is difficult, such as a suspiciousness degree.

FIG. 1 shows an example of the overall configuration of the suspiciousness degree estimation system 1. With reference to FIG. 1, the suspiciousness degree estimation system 1 has the suspiciousness degree estimation model generation device 2, the camera 3, and the suspiciousness degree estimation device 4. As shown in FIG. 1, the camera 3 and the suspiciousness degree estimation device 4 are connected so as to be able to communicate with each other. The suspiciousness degree estimation device 4 and the suspiciousness degree estimation model generation device 2 are also connected so as to be able to communicate with each other. The camera 3 and the suspiciousness degree estimation device 4, and the suspiciousness degree estimation device 4 and the suspiciousness degree estimation model generation device 2 may be connected via a network which is not shown in the drawings, respectively.

The suspiciousness degree estimation model generation device 2 is an information processing device. The suspiciousness degree estimation model generation device 2 generates the suspiciousness degree estimation model 242 based on, for example, the face suspiciousness degree information 241 previously stored. Then, the suspiciousness degree estimation model generation device 2 transmits the generated suspiciousness degree estimation model 242 to the suspiciousness degree estimation device 4.

FIG. 2 is an example of main components included by the suspiciousness degree estimation model generation device 2. With reference to FIG. 2, the suspiciousness degree estimation model generation device 2 includes, as main components, a communication I/F part 21, an operation input part 22, a screen display part 23, a storage part 24, and an arithmetic processing part 25, for example.

The communication I/F part 21 is formed by a data communication circuit and has a function of performing data communication with various devices connected via a communication line. The suspiciousness degree estimation model generation device 2 can transmit information to and receive information from the suspiciousness degree estimation device 4 and an external device which is not shown in the drawings via the communication I/F part 21.

The operation input part 22 is an operation input device such as a keyboard and a mouse. The operation input part 22 detects operation to the operation input device by an operator who operates the suspiciousness degree estimation model generation device 2 and outputs to the arithmetic processing part 25. As the configuration of the operation input device 22, a general configuration can be employed.

The screen display part 23 is a screen display device such as an LCD (Liquid Crystal Display). The screen display part 23 can display, on a screen, various information such as the face suspiciousness degree information 241 and the suspiciousness degree estimation model 242 in accordance with an instruction from the arithmetic processing part 25.

The storage part 24 is a storage device such as a hard disk and a memory. In the storage part 24, processing information necessary for various processing in the arithmetic processing part 25 and a program 243 are stored. The program 243 is a program loaded and executed by the arithmetic processing part 25 to realize various processing parts. The program 243 is previously loaded from an external device (not shown) or a storage medium (not shown) via a data input/output function such as the communication I/F part 21, and stored in the storage part 24. Main information stored in the storage part 24 is the face suspiciousness degree information 241 and the suspiciousness degree estimation model 242.

The face suspiciousness degree information 241 is information in which a face image that is image data including the face of a person is associated with suspiciousness degree information showing the suspiciousness degree of the person of the face image. For example, the face suspiciousness degree information 241 is previously acquired from an external database or the like via the communication I/F part 21, or previously input by using the operation input part 22.

With reference to FIG. 3, in the face suspiciousness degree information 241, identification information, a face image, and suspiciousness degree information are associated with each other. For example, in the first row of FIG. 3, identification information "1," a face image "A," and suspiciousness degree information "a" are associated. In other words, the first row of FIG. 3 shows that the suspiciousness degree of a person of the face image "A" is "a."

Herein, identification information in FIG. 3 is information which is previously assigned to each face image. Identification information can be used for identifying a face image and information in which a face image is associated with suspiciousness degree information. A face image in FIG. 3 is image data obtained by imaging the face of a person and its surroundings, and previously imaged by the camera 3 or another imaging device which is not shown in the drawings. Suspiciousness degree information in FIG. 3 shows, for example, whether or not a person shown by a face image has an arrest record or is wanted, and shows whether or not the person shown by the face image is a blacklisted person. Suspiciousness degree information may show only the presence/absence of a suspiciousness degree (whether or not a person is suspicious) as described above, or may show a graded evaluation as a result of evaluating a person by using multiple grades in accordance with the risk degree of the person, such as charge in the past.

The suspiciousness degree estimation model 242 is an estimation model generated by an estimation model generation unit 253 based on the result of clustering face images to be described later and suspiciousness degree information associated with the respective face images included in the result of clustering. The suspiciousness degree estimation model 242 is generated, for example, by associating each cluster, each face image or the like included in the clustering result with suspiciousness degree information. The suspiciousness degree estimation model 242 is transmitted to the suspiciousness degree estimation device 4 via the communication I/F part 21. The suspiciousness degree estimation model 242 is used when the suspiciousness degree estimation device 4 estimates the suspiciousness degree of a person of a face image with unknown suspiciousness degree information acquired by the camera 3.

The arithmetic processing part 25 has a microprocessor such as an MPU (Micro-Processing Unit) and its peripheral circuit. The arithmetic processing part 25 loads and executes the program 243 from the storage part 24 so as to cause the abovementioned hardware and the program 243 to cooperate with each other and realize various processing parts. Main processing parts realized by the arithmetic processing part 25 are, for example, a face feature extraction unit 251, a clustering unit 252, and an estimation model generation unit 253 (a suspiciousness degree estimation model generation unit).

The face feature extraction unit 251 extracts, from each of the face images included by the face suspiciousness degree information 241, a feature of a face (a face area) of a person shown by the face image. Then, the face feature extraction unit 251 transmits information showing the extracted feature to the clustering unit 252.

For example, the face feature extraction unit 251 acquires a face image from the face suspiciousness degree information 241. Subsequently, the face feature extraction unit 251 extracts a face area of a person in the acquired face image. Then, the face feature extraction unit 251 extracts the features of feature points such as eyes, a nose and a mouse included in the extracted face area. After that, the face feature extraction unit 251 groups the extracted features together to calculate a feature vector.

Thus, the face feature extraction unit 251 calculates, from a face image included in the face suspiciousness degree information 241, a feature vector that is the feature of the face image. After that, the face feature extraction unit 251 transmits the calculated feature vector as the feature of the face image to the clustering unit 252. In this example embodiment, when the face feature extraction unit 251 extracts a face area or extracts the features of feature points, a specific method for calculating a feature vector is not particularly limited. The face feature extraction unit 251 can calculate a feature vector by various known methods.

The clustering unit 252 clusters face images included in the face suspiciousness degree information 241 by using a feature vector received from the face feature extraction unit 251. At this time, the clustering unit 252 performs clustering without using the suspiciousness degree information included in the face suspiciousness degree information 241. Thus, the clustering unit 252 performs clustering of face images included in the face suspiciousness degree information 241 in accordance with the approximation degree of features (feature vectors) extracted from the face images by using only the features (the feature vectors) without using the suspiciousness degree information. In other words, the clustering unit 252 generates a cluster based on the approximation degree of face features by using features extracted from the face images and classifies the face images included in the face suspiciousness degree information 241 to a plurality of clusters. Then, the clustering unit 252 transmits a clustering result that is the result of clustering to the estimation model generation unit 253.

The estimation model generation unit 253 generates the suspiciousness degree estimation model 242 based on the result of clustering by the clustering unit 252 and the suspiciousness degree information previously associated with the face images included in the clustering result. Then, the estimation model generation unit 253 transmits the generated suspiciousness degree estimation model 242 to the suspiciousness degree estimation device 4 via the communication I/F part 21. The estimation model generation unit 253 also stores the generated suspiciousness degree estimation model 242 into the storage part 24.

For example, the estimation model generation unit 253 receives the clustering result from the clustering unit 252. Moreover, the estimation model generation unit 253 refers to the face suspiciousness degree information 241 and checks suspiciousness degree information associated with each of the face images included in the clustering result. Then, the estimation model generation unit 253 generates the suspiciousness degree estimation model 242 based on the clustering result and the suspiciousness degree information.

For example, the estimation model generation unit 253 generates the suspiciousness degree estimation model 242 by associating each of the clusters included in the clustering result with the suspiciousness degree information associated with the face images included in the cluster. To be specific, for example, the estimation model generation unit 253 associates each of the clusters with the average of the suspiciousness degree information associated with the face images included in the cluster (for example, regard suspicious=1 and unsuspicious=0 and calculate the average). Alternatively, the estimation model generation unit 253 generates the suspiciousness degree estimation model 242 by associating the suspiciousness degree information according to the number or ratio of face images associated with the suspicious degree information representing suspicious, with each of the clusters. For example, in a case where a predetermined ratio or more of suspiciousness degree information determined to be suspicious is included in a cluster, the estimation model generation unit 253 provides suspiciousness degree information representing suspicious to the suspiciousness degree information of the cluster.

Further, the estimation model generation unit 253 refers to the face suspiciousness degree information 241 and generates the suspiciousness degree estimation model 242 by associating each of the face images included in the clustering result with suspiciousness degree information associated with the face image.

Thus, the estimation model generation unit 253 generates the suspiciousness degree estimation model 242 based on a clustering result and suspiciousness degree information. After that, the estimation model generation unit 253 stores the generated suspiciousness degree estimation model 242 into the storage part 24 and also transmits to the suspiciousness degree estimation device 4 via the communication I/F part 21. The estimation model generation unit 253 may generate the suspiciousness degree estimation model 242 by any one or any combination of the methods exemplified above. Alternatively, the estimation model generation unit 253 may generate the suspiciousness degree estimation model 242 based on a clustering result and suspiciousness degree information by a method other than the methods exemplified above.

The camera 3 is an imaging unit such as a security camera that acquires image data. The camera 3 may be, for example, a network camera (IP camera), an intelligent camera, or the like. The camera 3 is installed at any place, for example, in a public facility such as an airport, in the city and in a shop, and acquires image data information 331, which is image data of a place where the camera 3 is installed. Then, the camera 3 transmits the acquired image data information 331 to the suspiciousness degree estimation device 4.

FIG. 4 shows an example of main components included by the camera 3. With reference to FIG. 4, the camera 3 includes, as main components, an imaging unit 31, a transmission/reception unit 32, and a storage device 33, for example.

The imaging unit 31 acquires image data of a place where the camera 3 is installed. Image data acquired by the imaging unit 31 contains image data of a person passing near the place where the camera 3 is installed. The imaging unit 31 stores the acquired image data as the image data information 331 into the storage device 33. The transmission/reception unit 32 transmits information to and receives information from the suspiciousness degree estimation device 4 and another device which is externally installed. In this example embodiment, the camera 3 transmits the image data information 331 acquired by the imaging unit 31, to the suspiciousness degree estimation device 4 via the transmission/reception unit 32. The storage device 33 is a storage device such as a memory. In the storage device 33, the image data information 331 and so on are stored.

The suspiciousness degree estimation device 4 is an information processing device. The suspiciousness degree estimation device 4 estimates the suspiciousness degree of a person included in the image data information 331 received from the camera 3 based on the suspiciousness degree estimation model 242 received from the suspiciousness degree estimation model generation device 2 and the image data information 331. For example, the suspiciousness degree estimation device 4 can display the estimated suspiciousness degree on a screen display part 43 or transmit to an external device via a communication I/F part 41.

FIG. 5 shows an example of main components included by the suspiciousness degree estimation device 4. With reference to FIG. 5, the suspiciousness degree estimation device 4 includes, as main components, the communication I/F part 41, an operation input part 42, the screen display part 43, a storage part 44, and an arithmetic processing part 45, for example.

The communication I/F part 41, the operation input part 42, and the screen display part 43 have the same configurations as the communication I/F part 21, the operation input part 22, and the screen display part 23 included by the suspiciousness degree estimation model generation device 2 described with reference to FIG. 2. Therefore, description of the communication I/F part 41, the operation input part 42, and the screen display part 43 will be omitted.

The storage part 44 is a storage device such as a hard disk and a memory. In the storage part 44, processing information necessary for various processing in the arithmetic processing part 45 and a program 442 are stored. The program 442 is a program loaded and executed by the arithmetic processing part 45 to realize various processing parts. The program 442 is previously loaded from an external device (not shown) or a storage medium (not shown) via a data input/output function such as the communication I/F part 41, and stored in the storage part 44. Main information stored in the storage part 44 is, for example, the suspiciousness degree estimation model 242, the image data information 331, and estimation result information 441.

The suspiciousness degree estimation model 242 is an estimation model generated in the suspiciousness degree estimation model generation device 2. The suspiciousness degree estimation model 242 is transmitted from the suspiciousness degree estimation model generation device 2 via the communication I/F part 41, and stored into the storage part 44.

The image data information 331 is image data acquired by the camera 3. The image data information 331 contains, for example, image data of a person passing near a place where the camera 3 is installed. The image data information 331 is transmitted from the camera 3 via the communication I/F part 41, and stored into the storage part 44.

The estimation result information 441 is information showing the suspiciousness degree of a person (an estimation target person) included in the image data information 331 acquired by the camera 3, estimated by the suspiciousness degree estimation unit 452. The estimation result information 441 has, for example, the same structure as the face suspiciousness degree information 241, and includes information in which information for identifying a person included in the image data information 331, for example, image data including the person is associated with an estimation result estimated by the suspiciousness degree estimation unit 452. As will be described later, the estimation result information 441 can display on the screen display part 43, or transmit to an external device via the communication I/F part 41.

Thus, in the storage part 44 included by the suspiciousness degree estimation device 4, the suspiciousness degree estimation model 242 generated by the suspiciousness degree estimation model generation device 2 and the image data information 331 acquired by the camera 3 are stored.

The arithmetic processing part 45 includes a microprocessor such as an MPU and its peripheral circuit. The arithmetic processing part 45 loads the program 442 from the storage part 44 and executes the program 442 so as to cause the abovementioned hardware and the program 442 to cooperate with each other and realize various processing parts. Main processing parts realized by the arithmetic processing part 45 are, for example, a face feature extraction unit 451 (a feature extraction unit) and a suspiciousness degree estimation unit 452.

The face feature extraction unit 451 extracts the feature of a face of a person (an estimation target person) included in the image data information 331. Then, the face feature extraction unit 451 transmits information showing the extracted feature of the face to the suspiciousness degree estimation unit 452.

For example, the face feature extraction unit 451 extracts a person included in the image data information 331 with reference to the image data information 331. Subsequently, the face feature extraction unit 451 extracts the face area of the extracted person. Then, the face feature extraction unit 451 extracts the features of feature points such as eyes, a nose and a mouth included in the extracted face area. After that, the face feature extraction unit 451 groups the extracted features together to calculate a feature vector.

Thus, the face feature extraction unit 451 calculates a feature vector that is the feature of a face from the face area of a person, in the same manner as the face feature extraction unit 251 of the suspiciousness degree estimation model generation device 2. After that, the face feature extraction unit 451 transmits the calculated feature vector to the suspiciousness degree estimation unit 452 as the feature of the face of the person from who the calculated feature vector has been extracted. In this example embodiment, there is no limitation on specific methods when the face feature extraction unit 451 extracts a person from the image data information 331, when extracting a face area, when extracting the features of feature points, or when calculating a feature vector. The face feature extraction unit 451 can calculate a feature vector by various known methods. However, it is desirable that the face feature extraction unit 451 calculates a feature vector by the same method as the face feature extraction unit 251.

The suspiciousness degree estimation unit 452 estimates the suspiciousness degree of a person from who a feature vector received from the face feature extraction unit 451 has been extracted, based on the feature vector and the suspiciousness degree estimation model 242 stored in the storage part 44. Then, the suspiciousness degree estimation unit 452 stores an estimation result as the estimation result information 441 in the storage part 44. Moreover, the suspiciousness degree estimation unit 452 can display the estimation result on the screen display part 43 or transmit the estimation result to an external device via the communication I/F part 41.

For example, the suspiciousness degree estimation unit 452 receives a feature vector from the face feature extraction unit 451. Moreover, the suspiciousness degree estimation unit 452 acquires the suspiciousness degree estimation model 242 from the storage part 44. Then, the suspiciousness degree estimation unit 452 identifies a cluster or face image whose feature is close to the received feature vector, and estimates the suspiciousness degree of a person from who the feature vector has been extracted, based on the suspiciousness degree information associated with the cluster or face image.

To be specific, for example, the suspiciousness degree estimation unit 452 calculates a distance between the received feature vector and each of the elements (features extracted from each of the face images) included in the suspiciousness degree estimation model 242. Then, the suspiciousness degree estimation unit 452 determines that the suspiciousness degree information of a person whose face feature is the most similar (for example, a face image having the closest distance between the features) is the suspiciousness degree information of the person from who the feature vector has been extracted. Alternatively, the suspiciousness degree estimation unit 452 sorts out a plurality of persons having similar face features, and takes the average of the suspiciousness degree information of the plurality of persons having similar features as the suspiciousness degree information of a person from who the feature vector has been extracted. That is, the suspiciousness degree estimation unit 452 estimates the suspiciousness degree information of a person from who the feature vector has been extracted, based on the suspiciousness degree information associated with the face image of a plurality of features close in distance between the features. The suspiciousness degree estimation unit 452 may identify the suspiciousness degree information in accordance with the ratio of the suspiciousness degree information among a plurality of persons having similar features. Alternatively, based on the distance between the received feature vector and each of the elements included in the suspiciousness degree estimation model 242, the suspiciousness degree estimation unit 452 identifies a cluster to which the feature vector belongs. Then, the suspiciousness degree estimation unit 452 considers that the suspiciousness degree information associated with the identified cluster is the suspiciousness degree information of the person from who the feature vector has been extracted.

Thus, the suspiciousness degree estimation unit 452 estimates the suspiciousness degree of a person from who a feature vector has been extracted, based on the feature vector and the suspiciousness degree estimation model 242. After that, the suspiciousness degree estimation unit 452 stores the estimated suspiciousness degree as the estimation result information 441 into the storage part 44, or displays on the screen display part 43.

The suspiciousness degree estimation unit 452 can be configured to estimate the suspiciousness degree of a person from who a feature vector has been extracted, by any one or any combination of the methods exemplified above. For example, the suspiciousness degree estimation unit 452 may be configured to estimate the suspiciousness degree of an estimation target person from who a feature vector has been extracted, based on the suspiciousness degree information of a person whose face feature is most similar or the average of the suspiciousness degree information of a plurality of persons whose face features are similar and the suspiciousness degree information associated with a cluster to which a feature vector belongs.

The above is description about an example of the respective components included by the suspiciousness degree estimation system 1. Subsequently, with reference to FIG. 6 and FIG. 7, an example of processing by the suspiciousness degree estimation model generation device 2 and processing by the suspiciousness degree estimation device 4 will be described.

First, with reference to FIG. 6, an example of processing when the suspiciousness degree estimation model generation device 2 generates the suspiciousness degree estimation model 242.

With reference to FIG. 6, the face feature extraction unit 251 of the suspiciousness degree estimation model generation device 2 extracts, from each of the face images included in the face suspiciousness degree information 241, a feature vector that is the feature of a face of the face image (step S101). Then, the face feature extraction unit 251 transmits information showing the extracted feature vector to the clustering unit 252.

The clustering unit 252 clusters the face images included in the face suspiciousness degree information 241 by using the feature vectors received from the face feature extraction unit 251 (step S102). At this time, the clustering unit 252 performs clustering without using the suspiciousness degree information included in the face suspiciousness degree information 241. After that, the clustering unit 252 transmits a clustering result, which is the result of the clustering, to the estimation model generation unit 253 (step S102).

The estimation model generation unit 253 receives the clustering result from the clustering unit 252. Moreover, the estimation model generation unit 253 refers to the face suspiciousness degree information 241 to check the suspiciousness degree information associated with each of the face images included in the clustering result. Then, the estimation model generation unit 253 generates the suspiciousness degree estimation model 242 based on the clustering result and the suspiciousness degree information (step S103). After that, the estimation model generation unit 253 stores the generated suspiciousness degree estimation model 242 into the storage part 24 or transmits to the suspiciousness degree estimation device 4 via the communication I/F part 21.

The above is an example of processing when the suspiciousness degree estimation model generation device 2 generates the suspiciousness degree estimation model 242. Subsequently, with reference to FIG. 7, an example of processing when the suspiciousness degree estimation device 4 estimates the suspiciousness degree of a person will be described.

With reference to FIG. 7, the face feature extraction unit 451 of the suspiciousness degree estimation device 4 extracts a person (an estimation target person) included in the image data information 331 from the image data information 331 (step S201). Moreover, the face feature extraction unit 451 extracts a feature vector that is the feature of a face area of the extracted person (step S202). Then, the face feature extraction unit 451 transmits information showing the extracted feature vector to the suspiciousness degree estimation unit 452.

The suspiciousness degree estimation unit 452 receives the feature vector from the face feature extraction unit 451. Moreover, the suspiciousness degree estimation unit 452 acquires the suspiciousness degree estimation model 242 from the storage part 44. Then, the suspiciousness degree estimation unit 452 estimates the suspiciousness degree of the person of the face image shown by the image data information 331, based on the feature vector and the suspiciousness degree estimation model 242 (step S203). After that, the suspiciousness degree estimation unit 452 stores the estimated suspiciousness degree as the estimation result information 441 into the storage part 44 or displays on the screen display part 43.

The above is an example of processing when the suspiciousness degree estimation device 4 estimates the suspiciousness degree of a person.

Thus, the suspiciousness degree estimation model generation device 2 in this example embodiment has the face feature extraction unit 251, the clustering unit 252, and the estimation model generation unit 253. With such a configuration, the clustering unit 252 can perform clustering of face images using only features extracted by the face feature extraction unit 251. Moreover, the estimation model generation unit 253 can generate the suspiciousness degree estimation model 242 based on the result of clustering performed using only features and the suspiciousness degree information previously associated with face images included in the clustering result. As a result, the suspiciousness degree estimation model generation device 2 can generate the suspiciousness degree estimation model 242 without defining a suspiciousness degree, and can generate the suspiciousness degree estimation model 242 that can be used in estimating a suspiciousness degree for which class definition is difficult.

Further, the suspiciousness degree estimation device 4 in this example embodiment has the face feature extraction unit 451 and the suspiciousness degree estimation unit 452, and is configured to receive the suspiciousness degree estimation model 242 from the suspiciousness degree estimation model generation device 2. With such a configuration, the suspiciousness degree estimation unit 452 can estimate the suspiciousness degree of a person from who the face feature extraction unit 451 has extracted a feature, based on the feature extracted by the feature extraction unit 451 and the suspiciousness degree estimation model 242 received from the suspiciousness degree estimation model generation device 2. That is, such a configuration allows estimation of a suspiciousness degree for which class definition is difficult.

In this example embodiment, the suspiciousness degree estimation system 1 has the suspiciousness degree estimation model generation device 2, the camera 3, and the suspiciousness degree estimation device 4. However, the configuration of the suspiciousness degree estimation system 1 is not limited to the case exemplified in this example embodiment. For example, the suspiciousness degree estimation model generation device 2 and the suspiciousness degree estimation device 4 may be configured integrally as one information processing device. That is, the suspiciousness degree estimation system 1 may include an information processing device which has a function as the suspiciousness degree estimation model generation device 2 and a function as the suspiciousness degree estimation device 4, and the camera 3. Alternatively, the camera 3 may have the function as the suspiciousness degree estimation device 4 or the suspiciousness degree estimation model generation device 2. In other words, the suspiciousness degree estimation system 1 may include only the camera 3 that has the function as the suspiciousness degree estimation model generation device 2 and the function as the suspiciousness degree estimation device 4. The camera 3 may have only part of the function as the suspiciousness degree estimation device 4 and the function as the suspiciousness degree estimation model generation device 2, for example, only a function as the face feature extraction unit 451 in the function as the suspiciousness degree estimation device 4 and the function as the suspiciousness degree estimation model generation device 2. Moreover, in a case where the camera 3 has part of the function as the suspiciousness degree estimation device 4 or the function as the suspiciousness degree estimation model generation device 2, the suspiciousness degree estimation device 4 and the suspiciousness degree estimation model generation device 2 may not have the function of the camera 3.

Further, in this example embodiment, the face feature extraction unit 251 extracts a feature from each of the face images included in the face suspiciousness degree information 241. However, a target from which the face feature extraction unit 251 extracts a feature is not limited to the face suspiciousness degree information 241. The face feature extraction unit 251 may extract a feature from a person in image data acquired from the camera 3 or an external device via the communication I/F part 21. In this case, the clustering unit 252 performs clustering of face images acquired from the face suspiciousness degree information 241 and an external device.

Second Example Embodiment

Figures 9, 10:
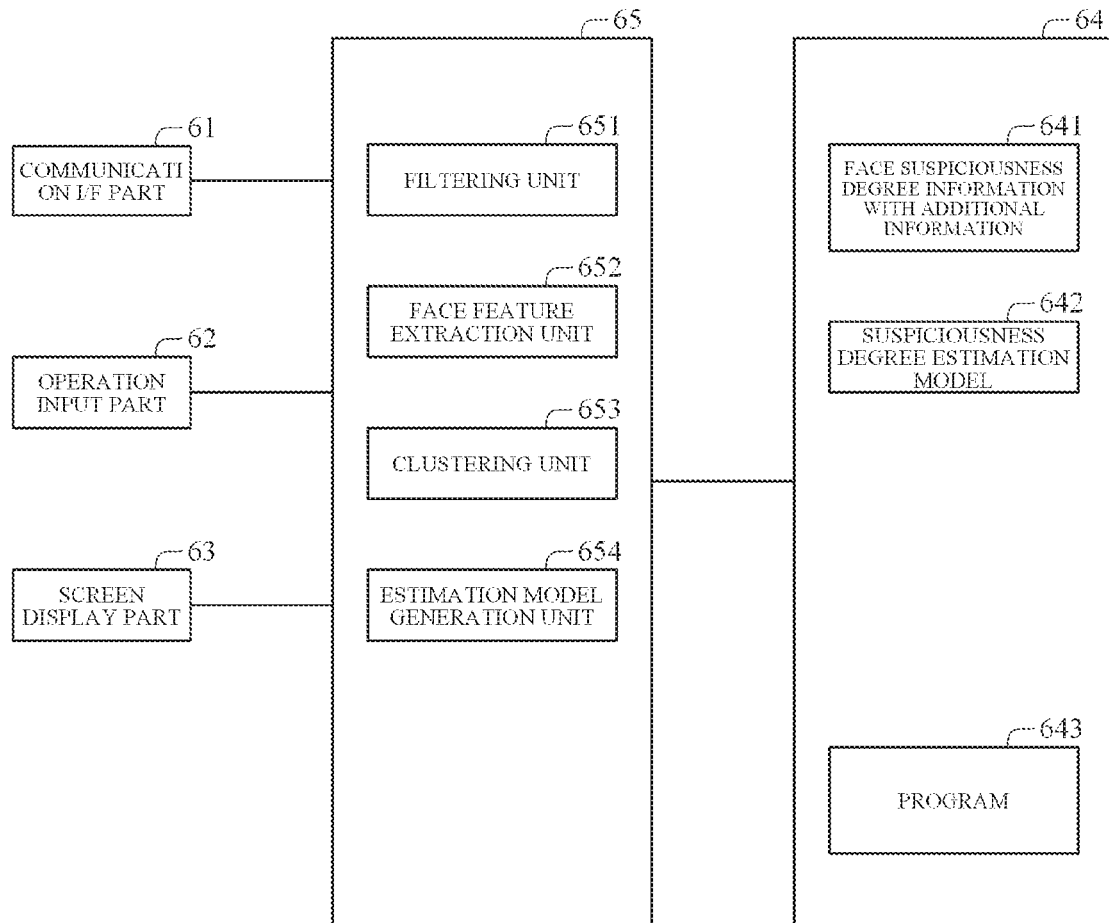
FIG. 9 is a block diagram showing an example of the configuration of a suspiciousness degree estimation model generation device shown in FIG. 8.
FIG. 10 is a diagram showing an example of face suspiciousness degree information with additional information shown in FIG. 9.
Figure 11:
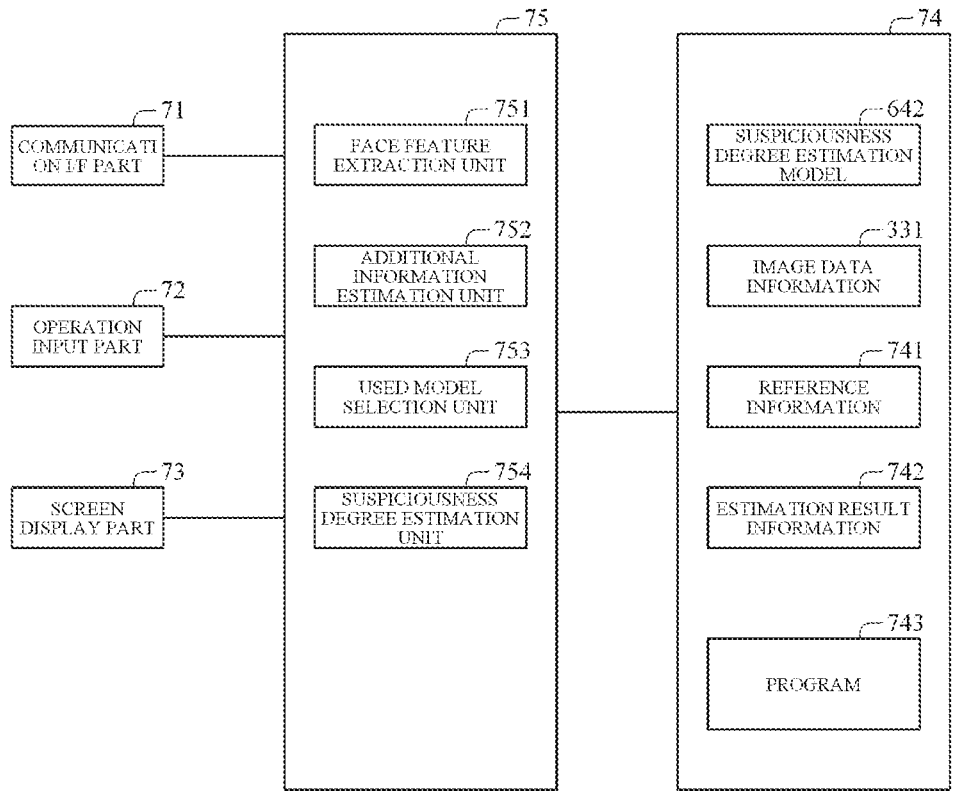
FIG. 11 is a block diagram showing an example of the configuration of a suspiciousness degree estimation device shown in FIG. 8.
Figure 12:
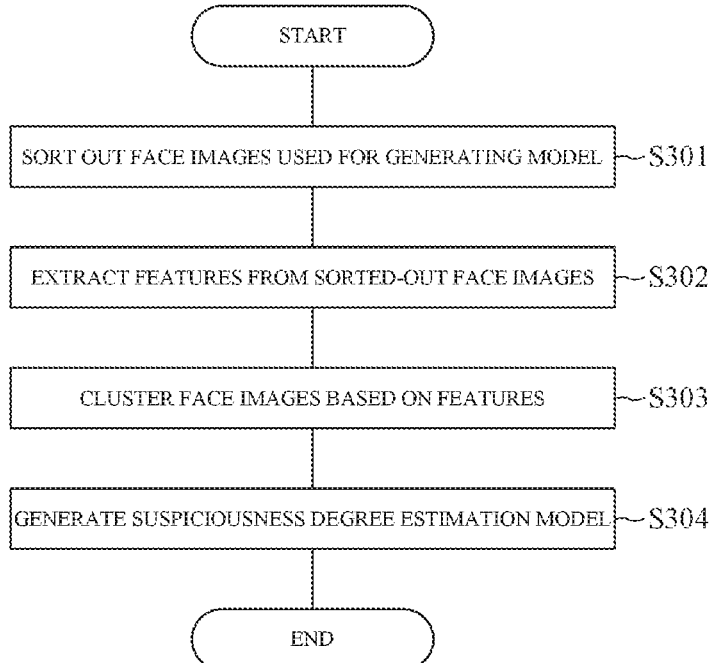
FIG. 12 is a flowchart showing an example of processing when the suspiciousness degree estimation model generation device generates a suspiciousness degree estimation model.
Figure 13:
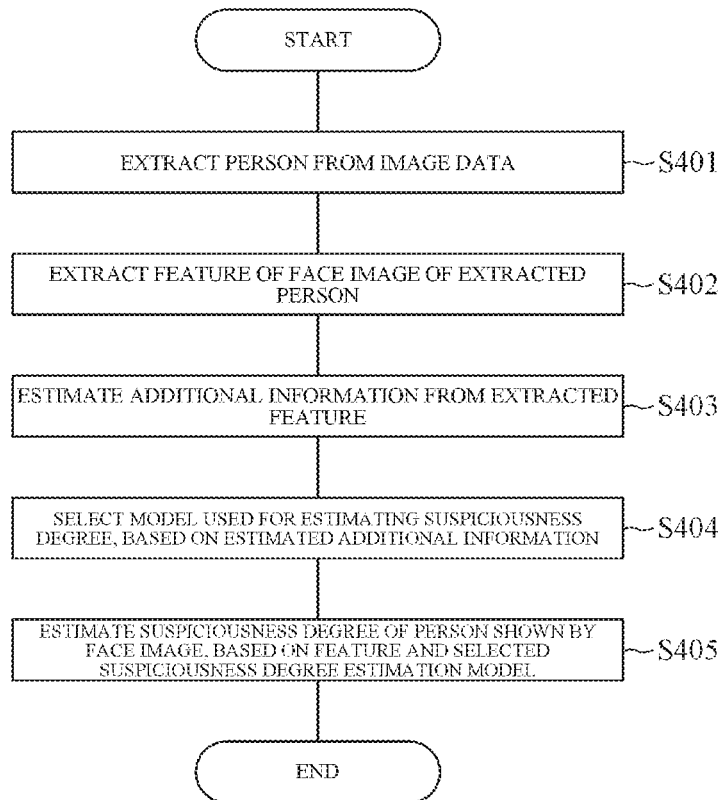
FIG. 13 is a flowchart showing an example of processing when the suspiciousness degree estimation device estimates the suspiciousness degree of a person.

Next, a second example embodiment of the present invention will be described with reference to FIGS. 8 to 13. FIG. 8 is a diagram showing an example of the overall configuration of a suspiciousness degree estimation system 5. FIG. 9 is a block diagram showing an example of the configuration of a suspiciousness degree estimation model generation device 6. FIG. 10 is a diagram showing an example of face suspiciousness degree information with additional information 641. FIG. 11 is a block diagram showing an example of the configuration of the suspiciousness degree estimation device 7. FIG. 12 is a flowchart showing an example of processing when the suspiciousness degree estimation model generation device 6 generates a suspiciousness degree estimation model 642. FIG. 13 is a flowchart showing an example of processing when the suspiciousness degree estimation device 7 estimates the suspiciousness degree of a person.

In the second example embodiment, the suspiciousness degree estimation system 5 that estimates the suspiciousness degree of a person imaged with the camera 3 as in the first example embodiment will be described. As will be described later, the suspiciousness degree estimation system 5 in this example embodiment has a difference from the first example embodiment in using additional information when generating an estimation model and when performing estimation.

FIG. 8 shows an example of the overall configuration of the suspiciousness degree estimation system 5. With reference to FIG. 8, the suspiciousness degree estimation system 5 has the suspiciousness degree estimation model generation device 6, the camera 3, and the suspiciousness degree estimation device 7. Thus, the suspiciousness degree estimation system 5 in this example embodiment is different from the suspiciousness degree estimation system 1 described in the first example embodiment in having the suspiciousness degree estimation model generation device 6 and the suspiciousness degree estimation device 7. Therefore, the suspiciousness degree estimation model generation device 6 and the suspiciousness degree estimation device 7 will be described below.

The suspiciousness degree estimation model generation device 6 is an information processing device. The suspiciousness degree estimation model generation device 6 generates the suspiciousness degree estimation model 642, for example, based on the face suspiciousness degree information with additional information 641 previously stored. Then, the suspiciousness degree estimation model generation device 6 transmits the generated suspiciousness degree estimation model 642 to the suspiciousness degree estimation device 7.

FIG. 9 is an example of main components included by the suspiciousness degree estimation model generation device 6. With reference to FIG. 9, the suspiciousness degree estimation model generation device 6 includes, as main components, a communication I/F part 61, an operation input part 62, a screen display part 63, a storage part 64, and an arithmetic processing part 65, for example.

The communication I/F part 61, the operation input part 62, and the screen display part 63 have the same configurations as the communication I/F part 21, the operation input part 22, and the screen display part 23 of the suspiciousness degree estimation model generation device 2 described with reference to FIG. 2. Therefore, description of the communication I/F part 61, the operation input part 62, and the screen display part 63 will be omitted.

The storage part 64 is a storage device such as a hard disk and a memory. In the storage part 64, processing information necessary for various processing in the arithmetic processing part 65 and a program 643 are stored. The program 643 is a program loaded and executed by the arithmetic processing part 65 to realize various processing parts. The program 643 is previously loaded from an external device (not shown) or a storage medium (not shown) via a data input/output function such as the communication I/F part 61 and stored in the storage part 64. Main information stored in the storage part 64 is the face suspiciousness degree information with additional information 641 and the suspiciousness degree estimation model 642.

The face suspiciousness degree information with additional information 641 is information in which a face image that is image data including the face of a person, suspiciousness degree information showing the suspiciousness degree of the person shown by the face image, and additional information showing information added to the face image such as age and gender of the person shown by the face image are associated with each other. The face suspiciousness degree information with additional information 641 is previously acquired from an external database via the communication I/F part 61 or previously input using the operation input part 62, for example.

With reference to FIG. 10, in the face suspiciousness degree information with additional information 641, identification information, a face image, suspiciousness degree information, and additional information are associated with each other. For example, in the first row of FIG. 10, identification information "1," a face image "A," suspiciousness degree information "a," and load information "x" are associated. In other words, the first row of FIG. 3 shows that the suspiciousness degree of a person shown by the face image "A" is "a" and additional information is "x."

Herein, identification information, a face image, and suspiciousness degree information in FIG. 10 are the same information as in the face suspiciousness degree information 241 described with reference to FIG. 3 in the first example embodiment. Therefore, description thereof will be omitted. The additional information is information such as age and gender of a person shown by a face image, and is also information related to the face image. The additional information may include information other than exemplified above, but is desirable to be information which can be estimated based on a feature extracted from a face image. In other word, the additional information is not limited to the case exemplified above, but is desirable to be information for which class definition is easy.

The suspiciousness degree estimation model 642 is a model generated based on the result of clustering face images and suspiciousness degree information associated with each of the face images included in the clustering result. The suspiciousness degree estimation model 642 is, for example, transmitted to the suspiciousness degree estimation device 7, and used when estimating the suspiciousness degree of a person shown by a face image, acquired by the camera 3, whose suspiciousness degree information is unknown.

As will be described later, the clustering unit 653 in this example embodiment clusters face images after being sorted out by a filtering unit 651. Therefore, a target of clustering by the clustering unit 653 in this example embodiment is all or part of the face images included in the face suspiciousness degree information with additional information 641. Thus, the number of face images included in the suspiciousness degree estimation model 642 is equal to or less than the number of the face images included in the face suspiciousness degree information with additional information 641. Moreover, the suspiciousness degree estimation model 642 in this example embodiment may include information for identifying additional information used in sorting out the face images included in the suspiciousness degree estimation model 642.

Further, as will be described later, the filtering unit 651 may be configured to execute sorting out plural times on the single face suspiciousness degree information with additional information 641. As a result, the estimation model generation unit 654 generates a plurality of estimation models in accordance with sorting out by the filtering unit 651. Therefore, the suspiciousness degree estimation model 642 may include plural kinds of estimation models including different face images, generated from the single face suspiciousness degree information with additional information 641. The plurality of estimation models included by the suspiciousness degree estimation model 642 can be identified with reference to information for identifying additional information included in each of the estimation models, for example.

The arithmetic processing part 65 includes a microprocessor such as an MPU and its peripheral circuit. The arithmetic processing part 65 loads the program 643 from the storage part 64 and executes the program 643 so as to cause the abovementioned hardware and the program 643 to cooperate with each other and realize various processing parts. Main processing parts realized by the arithmetic processing part 65 are, for example, the filtering unit 651, a face feature extraction unit 652, a clustering unit 653, and an estimation model generation unit 654.

The filtering unit 651 uses the additional information included in the face suspiciousness degree information with additional information 641 to sort out the face images included in the face suspicious degree information with additional information 641. Then, the filtering unit 651 transmits information showing the face images after being sorted out to the face feature extraction unit 652. Moreover, the filtering unit 651 transmits information showing a reference used in sorting out (that is, information for identifying the additional information) to the face feature extraction unit 652, the estimation model generation unit 654, and so on.

For example, the filtering unit 651 sorts out only a face image whose additional information is "male" from among the face images included in the face suspiciousness degree information with additional information 641. Alternatively, the filtering unit 651 sorts out only a face image whose additional information is "female" and whose age is "20 to 40 years old" from among face images included in the face suspiciousness degree information with additional information 641. Thus, the filtering unit 651 uses the additional information included in the face suspiciousness degree information with additional information 641 to sort out face image included in the face suspiciousness degree information with additional information 641. Then, the filtering unit 651 transmits information indicating the face image after sorting out to the face feature extraction unit 652.

It can be arbitrarily set which additional information is used by the filtering unit 651 in sorting out the face images included in the face suspiciousness degree information with additional information 641. For example, the filtering unit 651 may be configured to sort out face images by using additional information corresponding to a person image estimated to be a target for estimating a suspiciousness degree. As described above, the filtering unit 651 may sort out face images by using only one additional information, or may sort out face images by using a plurality of additional information.

Further, for example, the filtering unit 651 may be configured to perform sorting out multiple times on the single face suspiciousness degree information with additional information 641. For example, the filtering unit 651 may be configured to, after transmitting only face images whose additional information is "male" to the face feature extraction means 652, transmit only face images whose additional information is "female" for generation of another estimation model to the face feature extraction unit 652. The filtering unit 651 may, when performing sorting out multiple times, perform sorting out so that face images to be sorted out do not overlap, or may perform sorting out so as to allow overlap. Moreover, the filtering unit 651 may perform sorting out so as to cover all the face images included in the suspiciousness degree estimation model 642 by performing sorting out multiple times.

The face feature extraction unit 652 extracts, from each of the face images shown by the information received from the filtering unit 651, a feature vector showing the feature of the face image. Then, the face feature extraction unit 251 transmits information showing the extracted feature vector to the clustering unit 252.

Processing when the face feature extraction unit 652 extracts a feature vector is the same as that of the face feature extraction unit 251 described in the first example embodiment. Therefore, description thereof will be omitted.

The clustering unit 653 uses feature vectors received from the face feature extraction unit 652 to cluster face images sorted out by the filtering unit 651. The clustering unit 653 performs clustering without using the suspiciousness degree information in the same manner as the clustering unit 252 described in the first embodiment. Then, the clustering unit 653 transmits a clustering result that is the result of clustering, to the estimation model generation unit 654.

The estimation model generation unit 654 generates the suspiciousness degree estimation model 642 based on the result of clustering by the clustering unit 653 and the suspiciousness degree information previously associated with the face images included in the clustering result. At this time, the estimation model generation unit 654 may include information for identifying additional information used in sorting out the face images included in the suspiciousness degree estimation model 642, into the suspiciousness degree estimation model 642 to be generated. Then, the estimation model generation unit 654 transmits the generated suspiciousness degree estimation model 642 to the suspiciousness degree estimation device 7 via the communication I/F unit 61. Moreover, the estimation model generation unit 654 stores the generated suspiciousness degree estimation model 642 into the storage part 64.

For example, the estimation model generation unit 654 receives a clustering result from the clustering unit 653. Moreover, the estimation model generation unit 654 refers to the face suspiciousness degree information with additional information 641 to check suspiciousness degree information associated with each of the face images included in the clustering result. Then, the estimation model generation unit 654 generates the suspiciousness degree estimation model 642 based on the clustering result and the suspiciousness degree information.

The estimation model generation unit 654 generates the suspiciousness degree estimation model 642 by the same processing as the estimation model generation unit 253 described in the first embodiment. Therefore, description of the details of specific processing by the estimation model generation unit 654 will be omitted. Moreover, the estimation model generation unit 654 in this example embodiment generates the suspiciousness degree estimation model 642 according to the result of filtering by the filtering unit 651. In other words, in a case where the filtering unit 651 performs sorting out multiple times, the estimation model generation unit 654 generates a plurality of suspiciousness degree estimation models 642.

The suspiciousness degree estimation device 7 is an information processing device. Based on the suspiciousness degree estimation model 642 received from the suspiciousness degree estimation model generation device 6 and the image data information 331 received from the camera 3, the suspiciousness degree estimation device 7 estimates the suspiciousness degree of a person (an estimation target person) included in the image data information 331. For example, the suspiciousness degree estimation device 4 may display the estimation result information 441 including the estimated suspiciousness degree on the screen display part 43 or may transmit the estimation result information 441 to an external device via the communication I/F part 41.

FIG. 11 is an example of main components included by the suspiciousness degree estimation device 7. With reference to FIG. 11, the suspiciousness degree estimation device 7 includes, as main components, a communication I/F part 71, an operation input part 72, a screen display part 73, a storage part 74, and an arithmetic processing part 75, for example.

The communication I/F part 71, the operation input part 72, and the screen display part 73 have the same configurations as the communication I/F part 21, the operation input part 22, and the screen display part 23 included by the suspiciousness degree estimation model generation device 2 described with reference to FIG. 2. Therefore, description of the communication I/F part 71, the operation input part 72, and the screen display part 73 will be omitted.

The storage part 74 is a storage device such as a hard disk and a memory. In the storage part 74, processing information necessary for various processing in the arithmetic processing part 75 and a program 743 are stored. The program 743 is a program loaded and executed by the arithmetic processing part 75 so as to realize various processing parts. The program 743 is previously loaded from an external device (not shown) or a storage medium (not shown) via a data input/output function such as the communication I/F part 71, and is stored in the storage part 74. Main information stored in the storage part 74 includes, for example, the suspiciousness degree estimation model 642, the image data information 331, reference information 741, and estimation result information 742.

The suspiciousness degree estimation model 642 is an estimation model generated by the suspiciousness degree estimation model generation device 6. The suspiciousness degree estimation model 642 is transmitted from the suspiciousness degree estimation model generation device 6 via the communication I/F part 71 and stored in the storage part 74.

Image data information 331 is image data acquired by the camera 3. The image data information 331 contains image data of a person passing near a place where the camera 3 is installed. The image data information 331 is transmitted from the camera 3 via the communication I/F part 71 and stored in the storage part 74.

The reference information 741 is information used as a reference in estimating additional information based on an extracted feature (feature vector). The reference information 741 contains, for example, information corresponding to additional information included in the face suspiciousness degree information with additional information 641. To be specific, for example, the reference information 741 may be a reference feature for each age group or information used as a reference for judging gender. The reference information 741 is previously generated by, for example, an external device or the like and previously loaded via the communication I/F part 71. The reference information 741 is used by the additional information estimation unit 752.

The estimation result information 742 is information estimated by the suspiciousness degree estimation unit 754, showing the suspiciousness degree of a person included in the image data information 331 acquired by the camera 3. The configuration of the estimation result information 742 is the same as the estimation result information 441 described in the first embodiment. Therefore, description thereof will be omitted.

The arithmetic processing part 75 includes a microprocessor such as an MPU and its peripheral circuit. The arithmetic processing part 75 loads the program 743 from the storage part 74 and executes the program 743 so as to cause the abovementioned hardware and the program 743 to cooperate with each other and realize various processing parts. Main processing parts realized by the arithmetic processing part 75 are, for example, a face feature extraction unit 751, an additional information estimation unit 752, a used model selection unit 753, and a suspiciousness degree estimation unit 754.

The face feature extraction unit 751 extracts a feature vector that is the feature of a face of a person (an estimation target person) included in the image data information 331. Then, the face feature extraction unit 751 transmits information showing the extracted feature vector to the additional information estimation unit 752 and also transmits the information to the suspiciousness degree estimation unit 754. Processing when the face feature extraction unit 751 extracts a feature vector is the same as that of the face feature extraction unit 451 described in the first embodiment. Therefore, description thereof will be omitted.

The additional information estimation unit 752 estimates, based on a feature vector received from the face feature extraction unit 751, additional information of a person from who the feature vector has been extracted. Then, the additional information estimation unit 752 transmits the estimated additional information to the used model selection unit 753.

For example, the additional information estimation unit 752 receives a feature vector from the face feature extraction unit 751. Moreover, the additional information estimation unit 752 refers to the reference information 741. Then, the additional information estimation unit 752 estimates additional information of a person from who the feature vector has been extracted, based on the feature vector and the reference information 741. To be specific, for example, the additional information estimation unit 752 refers to the reference information 741 and refers to a reference feature for each age. Then, the additional information estimation unit 752 estimates the age of a reference feature which is closest in distance to the received feature vector, as the age of the person from who the feature vector has been extracted. Moreover, the additional information estimation unit 752 estimates the gender of the person from who the feature vector has been extracted, based on the feature vector and the reference information 741. Thus, the additional information estimation unit 752 estimates additional information of the person from who the feature vector has been extracted, based on the feature vector and the reference information 741. After that, the additional information estimation unit 752 transmits the estimated additional information to the used model selection unit 753.

The used model selection unit 753 selects the suspiciousness degree estimation model 642 used when the suspiciousness degree estimation unit 754 estimates a suspiciousness degree, based on additional information received from the additional information estimation unit 752. After that, the used model selection unit 753 transmits information showing the selected suspiciousness degree estimation model 642 to the suspiciousness degree estimation unit 754.

For example, the used model selection unit 753 receives additional information from the additional information estimation unit 752. Moreover, the used model selection unit 753 refers to the suspiciousness degree estimation model 642 to check information for identifying additional information included in the suspiciousness degree estimation model 642. Then, the used model selection unit 753 selects the suspiciousness degree estimation model 642 corresponding to the additional information received from the additional information estimation unit 752. To be specific, for example, the used model selection unit 753 selects the suspiciousness degree estimation model 642 including information closest to the additional information received from the additional information estimation unit 752 or the suspiciousness degree estimation model 642 including the additional information. At this time, the used model selection unit 753 may be configured to select only one model or may be configured to select a plurality of models. After that, the used model selection unit 753 transmits information showing the selected suspiciousness degree estimation model 642 to the suspiciousness degree estimation unit 754.

The suspiciousness degree estimation unit 754 estimates, based on a feature vector received from the face feature extraction unit 751 and the suspiciousness degree estimation model 642 selected by the used model selection unit 753, the suspiciousness degree of a person from who the feature vector has been extracted (an estimation target person). Then, the suspiciousness degree estimation unit 754 stores the result of estimation as the estimation result information 742 into the storage part 74. Moreover, the suspiciousness degree estimation unit 754 may display the estimation result on the screen display part 73 or transmit the estimation result to an external device via the communication I/F part 71.

For example, the suspiciousness degree estimation unit 754 receives a feature vector from the face feature extraction unit 751. Moreover, the suspiciousness degree estimation unit 754 receives information showing the suspiciousness degree estimation model 642 from the used model selection unit 753. Then, the suspiciousness degree estimation unit 754 identifies a cluster or face image whose feature is close to the received feature vector, and estimates the suspiciousness degree of the person from who the feature vector has been extracted, from the suspiciousness degree information associated with the cluster or face image. Because a specific method is the same as described in the first example embodiment, description of the method will be omitted.

As described above, the used model selection unit 753 may select a plurality of suspiciousness degree estimation models 642. In this case, the suspiciousness degree estimation unit 754 estimates the suspiciousness degree of a person by using each of the plurality of suspiciousness degree estimation models 642. In such a case, the suspiciousness degree estimation unit 754 can integrate the suspiciousness degrees estimated by various known methods and consider as estimation of a final suspiciousness degree. For example, it is possible that the suspiciousness degree estimation unit 754 adopts a suspiciousness degree having the highest value in the estimated suspiciousness degree information. Alternatively, the suspiciousness degree estimation unit 754 may calculate the average of the estimated suspiciousness degrees. The suspiciousness degree estimation unit 754 may calculate a final suspiciousness degree by a method other than exemplified above.

The above is description of an example of the respective components included by the suspiciousness degree estimation system 5. Subsequently, with reference to FIG. 12 and FIG. 13, a example of operation of the suspiciousness degree estimation model generation device 6 and an example of operation of the suspiciousness degree estimation device 7 will be described.

First, with reference to FIG. 12, an example of processing when the suspiciousness degree estimation model generation device 6 generates the suspiciousness degree estimation model 642 will be described.

With reference to FIG. 12, the filtering unit 651 of the suspiciousness degree estimation model generation device 6, by using additional information contained by the face suspiciousness degree information 641 with additional image 641, sorts out face images to be used in generating the suspiciousness degree estimation model 642 from among face images included by the face suspiciousness degree information with additional information 641 (step S301). Then, the filtering unit 651 transmits information showing the face images after sorting out to the face feature extraction unit 652.

The face feature extraction unit 652 extracts, from each of the face images shown by the information received from the filtering unit 651, a feature vector indicating the feature of the face image (step S302). Then, the face feature extraction unit 652 transmits information showing the extracted feature vectors to the clustering unit 653.

The clustering unit 653 clusters the face images sorted out by the filtering unit 651, based on the feature vectors received from the face feature extraction unit 652 (step S303). After that, the clustering unit 653 transmits a clustering result, which is the result of clustering, to the estimation model generation unit 654.

The estimation model generation unit 654 receives the clustering result from the clustering unit 653. Moreover, the estimation model generation unit 654 refers to the face suspiciousness degree information with additional information 641 to check suspiciousness degree information associated with each of the face images included by the clustering result. Then, the estimation model generation unit 654 generates the suspiciousness degree estimation model 642 based on the clustering result and the suspiciousness degree information (step S304). After that, the estimation model generation unit 654 stores the generated suspiciousness degree estimation model 642 into the storage part 64 or transmits to the suspiciousness degree estimation device 7 via the communication I/F part 61.

The above is an example of processing performed when the suspiciousness degree estimation model generation device 6 generates the suspiciousness degree estimation model 642. Next, with reference to FIG. 13, an example of processing performed when the suspiciousness degree estimation device 7 estimates the suspiciousness degree of a person will be described.

With reference to FIG. 13, the face feature extraction unit 751 of the suspiciousness degree estimation device 7 extracts, from the image data information 331, a person included in the image data information 331 (an estimation target person) (step S401). Subsequently, the face feature extraction unit 751 extracts a feature vector, which is the feature of a face area of the extracted person (step S402). Then, the face feature extraction unit 751 transmits information showing the extracted feature vector to the additional information estimation unit 752 and the suspiciousness degree estimation unit 754.

The additional information estimation unit 752 estimates, based on the feature vector received from the face feature extraction unit 751, additional information of the person from who the feature vector has been extracted (step S403). Then, the additional information estimation unit 752 transmits the estimated additional information to the used model selection unit 753.

The used model selection unit 753 selects the suspiciousness degree estimation model 642 used by the suspiciousness degree estimation unit 754 when estimating a suspiciousness degree, based on the additional information received from the additional information estimation unit 752 (step S404). After that, the used model selection unit 753 transmits information showing the selected suspiciousness degree estimation model 642 to the suspiciousness degree estimation unit 754.

The suspiciousness degree estimation unit 754 receives the feature vector from the face feature extraction unit 751. Moreover, the suspiciousness degree estimation unit 754 receives the information showing the suspiciousness degree estimation model 642 from the used model selection unit 753. Then, the suspiciousness degree estimation unit 754 estimates the suspiciousness degree of the estimation target person, based on the received feature vector and the suspiciousness degree estimation model 642 selected by the used model selection unit 753 (step S405). After that, the suspiciousness degree estimation unit 754 stores the estimated suspiciousness degree as the estimation result information 742 into the storage part 74 or display on the screen display part 73.

The above is an example of processing when the suspiciousness degree estimation device 7 estimates the suspiciousness degree of a person.

Thus, the suspiciousness degree estimation model generation device 6 in this example embodiment generates the suspiciousness degree estimation model 642 based on a face image after filtered by using additional information. Moreover, the suspiciousness degree estimation device 7 estimates the suspiciousness degree of a person based on the suspiciousness degree estimation model 642. With such a configuration, the suspiciousness degree estimation model generation device 6 can generate the suspiciousness degree estimation model 642 in which included face images have been previously sorted out by using additional information. As a result, the suspiciousness degree estimation device 7 can estimate the suspiciousness degree of an estimation target person, for example, based on the suspiciousness degree estimation model 642 including only a face image having additional information assumed as a suspicious person and a feature extracted from a face area of a person include by the image data information 331. Consequently, it is possible to previously narrow data to be compared with a feature, and it is possible to increase the speed of processing when estimating a suspiciousness degree. Moreover, it is possible to increase the accuracy.

The suspiciousness degree estimation system 5 in this example embodiment may include various modifications as in the suspiciousness degree estimation system 1 described in the first example embodiment.

Third Example Embodiment

Figure 14:
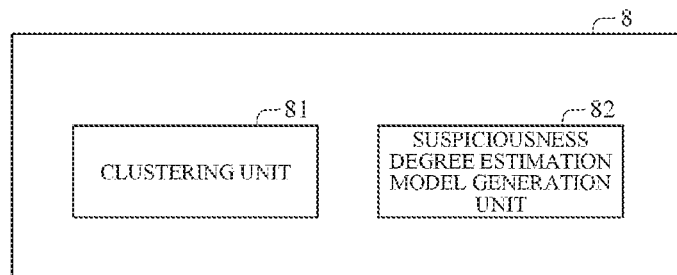
FIG. 14 is a schematic block diagram showing an example of the configuration of a suspiciousness degree estimation model generation device according to a third example embodiment of the present invention.
Figure 15:
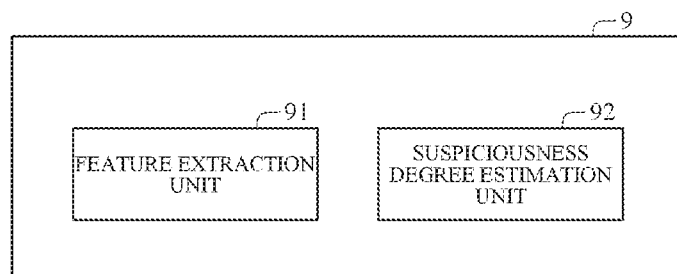
FIG. 15 is a schematic block diagram showing an example of the configuration of a suspiciousness degree estimation device according to a third example embodiment of the present invention.

Subsequently, a third example embodiment of the present invention will be described with reference to FIGS. 14 and 15. FIG. 14 is a schematic block diagram showing an example of the configuration of a suspiciousness degree estimation model generation device 8. FIG. 15 is a schematic block diagram showing an example of the configuration of a suspiciousness degree estimation device 9.

In the third example embodiment, the outline of the configuration of the suspiciousness degree estimation model generation device 8 that generates a suspiciousness degree estimation model will be described. Moreover, in this example embodiment, the outline of the configuration of the suspiciousness degree estimation device 9 that estimates the suspiciousness degree of a person by using a suspiciousness degree estimation model generated by an external device such as the suspiciousness degree estimation model generation device 8 will be described.

With reference to FIG. 14, the suspiciousness degree estimation model generation device 8 includes a clustering unit 81 and a suspiciousness degree estimation model generation unit 82. For example, the suspiciousness degree estimation model generation device 8 has a storage device and an arithmetic and logic unit, which are not shown in the drawings, and the abovementioned respective units are realized by an operation device executing a program stored in the storage device.

In the clustering unit 81, features extracted from face images are input. The clustering unit 81 clusters the face images based on the features extracted from the input face images. After that, the clustering unit 81 transmits the result of clustering to the suspiciousness degree estimation model generation unit 82.

The suspiciousness degree estimation model generation unit 82 receives the clustering result from the clustering unit 81. Then, the suspiciousness degree estimation model generation unit 82 generates a suspiciousness degree estimation model, based on the received clustering result and suspiciousness degree information previously associated with the face images included in the clustering result.

Herein, suspiciousness degree information refers to information showing the suspiciousness degree of a person shown by a face image. Moreover, a suspiciousness degree estimation model is used in estimating the suspiciousness degree of an estimation target person.

Thus, the suspiciousness degree estimation model generation unit 82 in this example embodiment includes the clustering unit 81 and the suspiciousness degree estimation model generation unit 82. With such a configuration, the clustering unit 81 can cluster face images based on features extracted from the face images. Moreover, the suspiciousness degree estimation model generation unit 82 can generate a suspiciousness degree estimation model based on the result of clustering performed using the features and suspiciousness degree information previously associated with the face images included in the clustering result. As a result, the suspiciousness degree estimation model generation device 8 can generate a suspiciousness degree estimation model without defining a suspiciousness degree, and can generate a suspiciousness degree estimation model which can be used when estimating a suspiciousness degree for which class definition is difficult.

The suspiciousness degree estimation model generation device 8 described above can be realized by incorporating a predetermined program in the suspiciousness degree estimation model generation device 8. To be specific, a program according to another aspect of the present invention is a program causing an information processing device to realize a clustering unit 81 and a suspiciousness degree estimation model generation unit 82. The clustering unit 81 clusters input face images based on features extracted from the input face images. The suspiciousness degree estimation model generation unit 82 generates a suspiciousness degree estimation model used for estimating the suspiciousness degree of an estimation target person, based on the result of clustering by the clustering unit 81 and suspiciousness degree information showing the suspiciousness degree of a person shown by the face image previously associated with the face image included in the clustering result.

Further, a suspiciousness degree estimation model generation method executed by the suspiciousness degree estimation model generation device 8 described above is a method including: clustering input face images based on features extracted from the face images; and generating a suspiciousness degree estimation model used when estimating the suspiciousness degree of an estimation target person based on the result of clustering and suspiciousness degree information showing the suspiciousness degree of a person shown by the face image included in the clustering result previously associated with the face image included in the clustered result.

The inventions of the program and the suspiciousness degree estimation model generation method having the configurations described above also have the same effect as the suspiciousness degree estimation model generation device 8, and therefore, can also achieve the object of the invention described above.

Further, with reference to FIG. 15, the suspiciousness degree estimation device 9 has a feature extraction unit 91 and a suspiciousness degree estimation unit 92. For example, the suspiciousness degree estimation device 9 has a storage device and an arithmetic and logic unit, which are not shown in the drawings, and the abovementioned respective units are realized by the arithmetic and logic unit executing a program stored in the storage device.

The feature extraction unit 91 extracts a feature from the face area of an estimation target person. The details of processing when the feature extraction unit 91 extracts the feature of a face area of a person from image data are not particularly limited in this example embodiment. After that, the feature extraction unit 91 transmits the extracted feature to the suspiciousness degree estimation unit 92.

The suspiciousness degree estimation unit 92 receives a feature from the feature extraction unit 91. Then, the suspiciousness degree estimation unit 92 estimates the suspiciousness degree of an estimation target person based on the received feature and a suspiciousness degree estimation model previously generated.

The suspiciousness degree estimation model is generated based on the result of clustering previously stored face images based on features extracted from the face images and suspiciousness degree information showing the suspiciousness degree of a person shown by the face image.

Thus, the suspiciousness degree estimation device 9 includes the feature extraction unit 91 and the suspiciousness degree estimation unit 92. Moreover, a suspiciousness degree estimation model used by the suspiciousness degree estimation unit 92 is previously generated based on the result of clustering face images based on features extracted from the face images. With such a configuration, the suspiciousness degree estimation unit 92 can estimate the suspiciousness degree of a person from who the feature extraction unit 91 has extracted a feature, based on the feature extracted by the feature extraction unit 91 and the suspiciousness degree estimation model. That is, according to the above configuration, it is possible to estimate a suspiciousness degree for which class definition is difficult.

The suspiciousness degree estimation device 9 described above can be realized by incorporating a predetermined program in the suspiciousness degree estimation device 9. To be specific, a program according to another aspect of the present invention is a program causing an information processing device to realize: the feature extracting unit 91 that extracts a feature from a face area of an estimation target person; and the suspiciousness degree estimation unit 92 that estimates the suspiciousness degree of the estimation target, based on the feature extracted by the feature extraction unit 91 and a previously generated suspiciousness degree estimation model. The suspiciousness degree estimation model is generated based on the result of clustering previously stored face images based on features extracted from the face images and suspiciousness degree information previously associated with a face image included in the clustering result, showing the suspiciousness degree of a person shown by the face image.

Further, the suspiciousness degree estimation method executed by the suspiciousness degree estimation device 9 described above is a method including: extracting a feature from the face area of an estimation target person; and estimating the suspiciousness degree of the estimation target person based on the extracted feature and based on a suspiciousness degree estimation model previously generated based on the result of clustering previously stored face images based on features extracted from the face images and based on suspiciousness degree information previously associated with face images included in the clustering result, showing the suspiciousness degree of the person shown by the face image.

The inventions of the program or the suspiciousness degree estimation method having the abovementioned configurations also have the same effect as the suspiciousness degree estimation device 9, and therefore can also achieve the object of the present invention.

<Supplementary Notes>

The whole or part of the example embodiments disclosed above can be described as the following supplementary notes. The overview of the suspiciousness degree estimation model generation device and so on according to the present invention will be described below.

However, the present invention is not limited to the following configurations.

(Supplementary Note 1)

A suspiciousness degree estimation model generation device comprising:

a clustering unit configured to perform clustering on an input face image based on a feature extracted from the face image; and a suspiciousness degree estimation model generation unit configured to generate a suspiciousness degree estimation model used for estimating a suspiciousness degree of an estimation target person, based on a result of clustering by the clustering unit and suspiciousness degree information previously associated with a face image included by the result of clustering, the suspiciousness degree information showing a suspiciousness degree of a person shown by the face image.

(Supplementary Note 2)

The suspiciousness degree estimation model generation device according to Supplementary Note 1, further comprising a face feature extraction unit configured to extract a feature from a face image included by face suspiciousness degree information that includes a face image and suspiciousness degree information showing a suspiciousness degree of a person shown by the face image, wherein the clustering unit is configured to perform clustering on the face image included by the face suspiciousness degree information based on the feature extracted by the face feature extraction unit.

(Supplementary Note 3)

The suspiciousness degree estimation model generation device according to Supplementary Note 2, wherein the clustering unit is configured to perform clustering on the face image included by the face suspiciousness degree information depending on an approximation degree of the feature extracted by the face feature extraction unit.

(Supplementary Note 4)

The suspiciousness degree estimation model generation device according to Supplementary Note 2 or 3, wherein the face suspiciousness degree information includes additional information added to the face image, the suspiciousness degree estimation model generation device further comprising a filtering unit configured to perform sorting on the face image included by the face suspiciousness degree information based on the additional information, wherein:

the face feature extraction unit is configured to extract a feature of the face image sorted out by the filtering unit; and the clustering unit is configured to perform clustering on the face image sorted out by the filtering unit has performed sorting, based on the feature extracted by the face feature extraction unit.

(Supplementary Note 5)

The suspiciousness degree estimation model generation device according to any of Supplementary Notes 1 to 4, wherein the suspiciousness degree estimation model generation unit is configured to associate each cluster of clusters included by the result of clustering with suspiciousness degree information based on the suspiciousness degree information associated with the face image included by the each cluster, and generate the suspiciousness degree estimation model.

(Supplementary Note 6)

A suspiciousness degree estimation model generation method comprising:

performing clustering on an input face image based on a feature extracted from the face image; and generating a suspiciousness degree estimation model used for estimating a suspiciousness degree of an estimation target person, based on a result of clustering and suspiciousness degree information previously associated with a face image included by the result of clustering, the suspiciousness degree information showing a suspiciousness degree of a person shown by the face image.

(Supplementary Note 6-1)

The suspiciousness degree estimation model generation method according to Supplementary Note 6, comprising:

extracting a feature from a face image included by face suspiciousness degree information that includes a face image and suspiciousness degree information showing a suspiciousness degree of a person shown by the face image; and performing clustering on the face image included by the face suspiciousness degree information based on the extracted feature.

(Supplementary Note 6-2)

The suspiciousness degree estimation model generation method according to Supplementary Note 6-1, comprising performing clustering on the face image included by the face suspiciousness degree information depending on an approximation degree of the extracted feature.

(Supplementary Note 7)

A program comprising instructions for causing an information processing device to realize:

a clustering unit configured to perform clustering on an input face image based on a feature extracted from the face image; and a suspiciousness degree estimation model generation unit configured to generate a suspiciousness degree estimation model used for estimating a suspiciousness degree of an estimation target person, based on a result of clustering by the clustering unit and suspiciousness degree information previously associated with a face image included by the result of clustering, the suspiciousness degree information showing a suspiciousness degree of a person shown by the face image.

(Supplementary Note 7-1)

The program according to Supplementary Note 7, comprising instructions for causing the information processing device to realize a face feature extraction unit configured to extract a feature from a face image included by face suspiciousness degree information that includes a face image and suspiciousness degree information showing a suspiciousness degree of a person shown by the face image, wherein the clustering unit is configured to perform clustering on the face image included by the face suspiciousness degree information based on the feature extracted by the face feature extraction unit.

(Supplementary Note 7-2)

The suspiciousness degree estimation model generation device according to Supplementary Note 7-1, wherein the clustering unit is configured to perform clustering on the face image included by the face suspiciousness degree information depending on an approximation degree of the feature extracted by the face feature extraction unit.

(Supplementary Note 8)

A suspiciousness degree estimation device comprising:

a feature extraction unit configured to extract a feature from a face area of an estimation target person; and a suspiciousness degree estimation unit configured to estimate a suspiciousness degree of the estimation target person, based on the feature extracted by the feature extraction unit and a previously generated suspiciousness degree estimation model, wherein the suspiciousness degree estimation model is generated based on a result of clustering on a previously stored face image based on a feature extracted from the face image and suspiciousness degree information previously associated with a face image included in the result of clustering, the suspiciousness degree information showing a suspiciousness degree of a person shown by the face image.

(Supplementary Note 9)

The suspiciousness degree estimation device according to Supplementary Note 8, wherein the suspiciousness degree estimation model is generated based on a result of clustering on the face image depending on an approximation degree of the feature, and suspiciousness degree information previously associated with a face image included in the result of the clustering, the suspiciousness degree information showing a suspiciousness degree of a person shown by the face image.

(Supplementary Note 10)

The suspiciousness degree estimation device according to Supplementary Note 8 or 9, wherein the suspiciousness degree estimation unit is configured to estimate a suspiciousness degree associated with a face image whose feature is closest in distance to the feature extracted by the feature extraction unit, as a suspiciousness degree of the estimation target person.

(Supplementary Note 11)

The suspiciousness degree estimation device according to Supplementary Note 8 or 9, wherein the suspiciousness degree estimation unit is configured to estimate a suspiciousness degree of the estimation target person, based on suspiciousness degrees associated with face images whose features are close in distance to the feature extracted by the feature extraction unit.

(Supplementary Note 12)

The suspiciousness degree estimation device according to Supplementary Note 8 or 9, wherein the suspiciousness degree estimation unit is configured to estimate a suspiciousness degree associated with a cluster to which the feature extracted by the feature extraction unit belongs, as a suspiciousness degree of the estimation target person.

(Supplementary Note 13)

The suspiciousness degree estimation device according to any of Supplementary Notes 8 to 12, further comprising:

an additional information estimation unit configured to estimate additional information of the estimation target person based on the feature extracted by the feature extraction unit; and a used model selection unit configured to select the suspiciousness estimation model used when the suspiciousness degree estimation unit performs estimation of a suspiciousness degree, based on the additional information estimated by the additional information estimation unit.

(Supplementary Note 14)

A suspiciousness degree estimation method comprising:

extracting a feature from a face area of an estimation target person; and estimating a suspiciousness degree of the estimation target person, based on the extracted feature and a suspiciousness degree estimation model previously generated based on a result of clustering on a previously stored face image based on a feature extracted from the face image and suspiciousness degree information previously associated with a face image included in the result of clustering, the suspiciousness degree information showing a suspiciousness degree of a person shown by the face image.

(Supplementary Note 14-1)

The suspiciousness degree estimation method according to Supplementary Note 14, wherein the suspiciousness degree estimation model is generated based on a result of clustering on the face image depending on an approximation degree of the feature, and suspiciousness degree information previously associated with a face image included in the result of the clustering, the suspiciousness degree information showing a suspiciousness degree of a person shown by the face image.

(Supplementary Note 14-2)

The suspiciousness degree estimation method according to Supplementary Note 14 or 14-1, comprising:

estimating additional information of the estimation target person based on the extracted feature; and selecting the suspiciousness degree estimation model used when performing estimation of a suspiciousness degree, based on the estimated additional information.

(Supplementary Note 15)

A program comprising instructions for causing an information processing device to realize:

a feature extraction unit configured to extract a feature from a face area of an estimation target person; and a suspiciousness degree estimation unit configured to estimate a suspiciousness degree of the estimation target person, based on the feature extracted by the feature extraction unit and a previously generated suspiciousness degree estimation model, wherein the suspiciousness degree estimation model is generated based on a result of clustering on a previously stored face image based on a feature extracted from the face image and suspiciousness degree information previously associated with a face image included in the result of clustering, the suspiciousness degree information showing a suspiciousness degree of a person shown by the face image.

(Supplementary Note 15-1)

The program according to Supplementary Note 15, wherein the suspiciousness degree estimation model is generated based on a result of clustering on the face image depending on an approximation degree of the feature, and suspiciousness degree information previously associated with a face image included in the result of the clustering, the suspiciousness degree information showing a suspiciousness degree of a person shown by the face image.

(Supplementary Note 15-2)

The program according to Supplementary Note 15 or 15-1, further comprising instructions for causing the information processing device to realize:

an additional information estimation unit configured to estimate additional information of the estimation target person based on the feature extracted by the feature extraction unit; and a used model selection unit configured to select the suspiciousness estimation model used when the suspiciousness degree estimation unit performs estimation of a suspiciousness degree, based on the additional information estimated by the additional information estimation unit.

(Supplementary Note 16)

A suspiciousness degree estimation system comprising a suspiciousness degree estimation model generation device and a suspiciousness degree estimation device, the suspiciousness degree estimation model generation device including:

a clustering unit configured to perform clustering on an input face image based on a feature extracted from the face image; and a suspiciousness degree estimation model generation unit configured to generate a suspiciousness degree estimation model used for estimating a suspiciousness degree of an estimation target person, based on a result of clustering by the clustering unit and suspiciousness degree information previously associated with a face image included by the result of clustering, the suspiciousness degree information showing a suspiciousness degree of a person shown by the face image, the suspiciousness degree estimation device including:

a feature extraction unit configured to extract a feature from a face area of an estimation target person; and a suspiciousness degree estimation unit configured to estimate a suspiciousness degree of the estimation target person, based on the feature extracted by the feature extraction unit and the suspiciousness degree estimation model generated by the suspiciousness degree estimation model generation device.

(Supplementary Note 16-1)

The suspiciousness degree estimation system according to Supplementary Note 16, wherein:

the suspiciousness degree estimation model generation device includes a face feature extraction unit configured to extract a feature from a face image included in face suspiciousness degree information including a face image and suspiciousness information showing a suspiciousness degree of a person shown by the face image; and the clustering unit is configured to perform clustering on the face image included by the face suspiciousness degree information based on a feature extracted by the face feature extraction unit.

(Supplementary Note 16-2)

The suspiciousness degree estimation system according to Supplementary Note 16 or 16-1, wherein the clustering unit of the suspiciousness degree estimation model generation device performs clustering on the face image included by the face suspiciousness degree information depending on an approximation degree of the feature extracted by the face feature extraction unit.

(Supplementary Note 17)

A camera having an imaging unit, the camera comprising:

a feature extraction unit configured to extract a feature from a face area of an estimation target person imaged by the imaging unit; and a suspiciousness degree estimation unit configured to estimate a suspiciousness degree of the estimation target person, based on the feature extracted by the feature extraction unit and a previously generated suspiciousness degree estimation model, wherein the suspiciousness degree estimation model is generated based on a result of clustering on a previously stored face image based on a feature extracted from the face image and suspiciousness degree information previously associated with a face image included in the result of clustering, the suspiciousness degree information showing a suspiciousness degree of a person shown by the face image.

(Supplementary Note 17-1)

The camera according to Supplementary Note 17, wherein the suspiciousness degree estimation model is generated based on a result of clustering on the face image depending on an approximation degree of the feature, and suspiciousness degree information previously associated with a face image included in the result of the clustering, the suspiciousness degree information showing a suspiciousness degree of a person shown by the face image.

(Supplementary Note 17-2)

The camera according to Supplementary Note 17, comprising;

an additional information estimation unit configured to estimate additional information of the estimation target person based on the feature extracted by the feature extraction unit; and a used model selection unit configured to select the suspiciousness estimation model used when the suspiciousness degree estimation unit performs estimation of a suspiciousness degree, based on the additional information estimated by the additional information estimation unit.

The program described in the example embodiments and supplementary notes is stored in a storage device, or recorded on a computer-readable recording medium. For example, the recording medium is a portable medium such as a flexible disk, an optical disk, a magneto-optical disk and a semiconductor memory.

Although the present invention has been described above with reference to the example embodiments, the present invention is not limited to the example embodiments. The configurations and details of the present invention can be changed in various manners that can be understood by one skilled in the art within the scope of the present invention.

DESCRIPTION OF NUMERALS

1 suspiciousness degree estimation system
2, 6 suspiciousness degree estimation model generation device
21, 61 communication I/F part
22, 62 operation input part
23, 63 screen display part
24, 64 storage part
241 face suspiciousness degree information
242 suspiciousness degree estimation model
243 program
641 face suspiciousness degree information with additional information
642 suspiciousness degree estimation model
25, 65 arithmetic processing part
251, 652 face feature extraction unit
252, 653 clustering unit
253, 654 estimation model generation unit
651 filtering unit
3 camera
31 imaging unit
32 transmission/reception unit
33 storage device
331 image data information
4, 7 suspiciousness degree estimation device
41, 71 communication I/F part
42, 72 operation input part
43, 73 screen display part
44, 74 storage part
441, 742 estimation result information
442, 743 program
741 reference information
45, 75 arithmetic processing part
451, 751 face feature extraction unit
452, 754 suspiciousness degree estimation unit
752 additional information estimation unit
753 used model selection unit
5 suspiciousness degree estimation system
6 suspiciousness degree estimation
8 suspiciousness degree estimation model generation device
81 clustering unit 82 suspiciousness degree estimation model generation unit
9 suspiciousness degree estimation device
91 feature extraction unit
92 suspiciousness degree estimation unit

The invention claimed is:

1. A system comprising:
at least one memory storing instructions; and
at least one processor connected to the at least one memory and configured to execute the instructions to:
refer to face suspiciousness degree information with additional information, the face suspiciousness degree information including a face image that is previously stored image data including a face of a person, suspiciousness degree information showing a suspiciousness degree of the person shown by the face image, and the additional information showing information added to the face image of the person shown by the face image;
sort out the face image included in the face suspiciousness degree information by using the additional information included in the face suspiciousness degree information with additional information;
extract a feature vector showing a feature of the face image from the face image sorted out;
cluster the face image sorted out, by using the feature vector extracted from the face image sorted out;
generate at least one suspiciousness degree estimation model in which the suspiciousness degree information corresponding to the clustered face image, the additional information corresponding to the clustered face image, and the clustered face image are associated with each other;
store the at least one suspiciousness degree estimation model into a storage device; and
select the at least one suspiciousness degree estimation model, when estimating a suspiciousness degree of an estimation target person by using a second feature vector extracted from a face area of the estimation target person included in an image data, based on other additional information of the estimation target person,
wherein the at least one suspiciousness degree estimation model indicates the suspiciousness degree of the estimation target person who is other than persons, including the person, of the previously stored image data including the clustered face image.

2. The system according to claim 1, wherein the at least one processor is configured to execute the instructions to
sort out the face image by using a plurality of the additional information from the face suspiciousness degree information.

3. The system according to claim 1, wherein the at least one processor is configured to execute the instructions to
generate a plurality of suspiciousness degree estimation models, including the at least one suspiciousness degree estimation model, according to sorting out the face image by using the additional information.

4. The system according to claim 1, wherein the at least one processor is configured to execute the instructions to:
extract the second feature vector from the face area of the estimation target person included in the image data;
estimate the other additional information of the estimation target person as an estimation result by using the second feature vector extracted from the image data and reference information used as a reference in estimating the other additional information based on the extracted second feature vector;
select the at least one suspiciousness degree estimation model, based on the other additional information of the estimation target person, from the storage device; and
estimate the suspiciousness degree of the estimation target person by using the second feature vector generated from the image data and the selected at least one suspiciousness degree estimation model.

5. The system according to claim 4, wherein the at least one processor is configured to execute the instructions to
display the estimation result of the estimation target person on a screen display.

6. A method comprising:
referring to face suspiciousness degree information with additional information, the face suspiciousness degree information including a face image that is previously stored image data including a face of a person, suspiciousness degree information showing a suspiciousness degree of the person shown by the face image, and the additional information showing information added to the face image of the person shown by the face image;
sorting out the face image included in the face suspiciousness degree information by using the additional information included in the face suspiciousness degree information with additional information;
extracting a feature vector showing a feature of the face image from the face image sorted out;
clustering the face image sorted out by using the feature vector extracted from the face image sorted out;
generating at least one suspiciousness degree estimation model in which the suspiciousness degree information corresponding to the clustered face image, the additional information corresponding to the clustered face image, and the clustered face image are associated with each other;
storing the at least one suspiciousness degree estimation model into a storage device; and
selecting the at least one suspiciousness degree estimation model, when estimating a suspiciousness degree of an estimation target person by using a second feature vector extracted from a face area of the estimation target person included in an image data, based on other additional information of the estimation target person,
wherein the at least one suspiciousness degree estimation model indicates the suspiciousness degree of the estimation target person who is other than persons, including the person, of the previously stored data including the clustered face image.

7. The method according to claim 6, further comprising
sorting out the face image by using a plurality of the additional information from the face suspiciousness degree information.

8. The method according to claim 6, further comprising
generating a plurality of suspiciousness degree estimation models, including the at least one suspiciousness degree estimation model, according to sorting out the face image by using the additional information.

9. The method according to claim 6, further comprising:
extracting the second feature vector from the face area of the estimation target person included in the image data;
estimating the other additional information of the estimation target person as an estimation result by using the second feature vector extracted from the image data and reference information used as a reference in estimating the other additional information based on the extracted second feature vector;

selecting the at least one suspiciousness degree estimation model, based on the other additional information of the estimation target person, from the storage device; and estimating the suspiciousness degree of the estimation target person by using the second feature vector generated from the image data and the selected at least one suspiciousness degree estimation model.

10. The method according to claim 9, further comprising displaying the estimation result of the estimation target person on a screen display.

11. A non-transitory program recording medium that records a program causing a computer to execute:

referring to face suspiciousness degree information with additional information, the face suspiciousness degree information including a face image that is previously stored image data including a face of a person, suspiciousness degree information showing a suspiciousness degree of the person shown by the face image, and the additional information showing information added to the face image of the person shown by the face image;

sorting out the face image included in the face suspiciousness degree information by using the additional information included in the face suspiciousness degree information with additional information;

extracting a feature vector showing a feature of the face image from the face image sorted out;

clustering the face image sorted out by using the feature vector extracted from the face image sorted out;

generating at least one suspiciousness degree estimation model in which the suspiciousness degree information corresponding to the clustered face image, the additional information corresponding to the clustered face image, and the clustered face image are associated with each other;

storing the at least one suspiciousness degree estimation model into a storage device; and selecting the at least one suspiciousness degree estimation model, when estimating a suspiciousness degree of an estimation target person by using a second feature vector extracted from a face area of the estimation target person included in an image data, based on other additional information of the estimation target person, wherein the at least one suspiciousness degree estimation model indicates the suspiciousness degree of the estimation target person who is other than persons, including the person, of the previously stored image data including the clustered face image.

12. The non-transitory program recording medium according to claim 11, wherein the program causes a computer to further execute sorting out the face image by using a plurality of the additional information from the face suspiciousness degree information.

13. The non-transitory program recording medium according to claim 11, wherein the program causes a computer to further execute generating a plurality of suspiciousness degree estimation models, including the at least one suspiciousness degree estimation model, according to sorting out the face image by using the additional information.

14. The non-transitory program recording medium according to claim 11, wherein the program causes a computer to further execute:

extracting the second feature vector from the face area of the estimation target person included in the image data;

estimating the other additional information of the estimation target person as an estimation result by using the second feature vector extracted from the image data and reference information used as a reference in estimating other additional information based on the extracted second feature vector;

selecting the at least one suspiciousness degree estimation model, based on the other additional information of the estimation target person, from the storage device; and estimating the suspiciousness degree of the estimation target person by using the second feature vector generated from the image data and the selected at least one suspiciousness degree estimation model.

15. The non-transitory program recording medium according to claim 14, wherein the program causes a computer to further execute displaying the estimation result of the estimation target person on a screen display.

16. The system according to claim 1, wherein the at least one hardware processor is further configured to execute the instructions to generate the at least one suspiciousness degree estimation model by:

obtaining at least one of a plurality of clusters of a clustering result including clustering the face image, determining whether the suspiciousness degree information, which is previously associated with each of previously stored face images, is associated with a previously extracted feature vector which is included in the at least one of the plurality of clusters, and setting the suspiciousness degree information to the at least one of the plurality of clusters based on determining that the suspiciousness degree information, which is previously associated with each of the previously stored face images including in the previously stored image data, is associated with the previously extracted feature vector which is included in the at least one of the plurality of clusters.

* * * * *